(12) United States Patent
Sayer

(10) Patent No.: US 11,597,069 B2
(45) Date of Patent: Mar. 7, 2023

(54) MULTIPURPOSE HANDLE AND WORKPIECE ATTACHMENT TOOL

(71) Applicant: Conrad Morgan Sayer, Tempe (AU)

(72) Inventor: Conrad Morgan Sayer, Tempe (AU)

( * ) Notice: Subject to any disclaimer, the term of this patent is extended or adjusted under 35 U.S.C. 154(b) by 419 days.

(21) Appl. No.: 16/924,606

(22) Filed: Jul. 9, 2020

(65) Prior Publication Data

US 2021/0008705 A1   Jan. 14, 2021

(51) Int. Cl.
| | |
|---|---|
| *B25F 1/00* | (2006.01) |
| *B25F 1/02* | (2006.01) |
| *B25G 3/24* | (2006.01) |
| *A01B 1/02* | (2006.01) |
| *A01B 1/22* | (2006.01) |
| *A01G 3/08* | (2006.01) |

(52) U.S. Cl.
CPC ............. *B25F 1/02* (2013.01); *A01B 1/02* (2013.01); *A01B 1/227* (2013.01); *B25F 1/006* (2013.01); *B25G 3/24* (2013.01); *A01G 3/083* (2013.01)

(58) Field of Classification Search
CPC ... B25F 1/02; B25F 1/006; B25G 3/24; A01G 3/083; A01B 1/227; A01B 1/02
USPC .......................................................... 294/51
See application file for complete search history.

(56) References Cited

U.S. PATENT DOCUMENTS

| | | | | | |
|---|---|---|---|---|---|
| 1,041,286 | A | * | 10/1912 | Hoskins | B23B 13/125 |
| | | | | | 403/314 |
| 5,288,161 | A | * | 2/1994 | Graves | B25G 3/18 |
| | | | | | 403/324 |
| 5,699,614 | A | * | 12/1997 | Garneau, Sr. | A47J 43/287 |
| | | | | | 30/142 |
| 6,367,854 | B1 | * | 4/2002 | Chou | B25G 1/01 |
| | | | | | 294/57 |
| 6,412,398 | B1 | * | 7/2002 | Norcross | A47J 43/283 |
| | | | | | 294/55.5 |
| 6,412,843 | B1 | * | 7/2002 | Burbrink | B25G 1/04 |
| | | | | | 294/57 |
| 8,966,691 | B2 | * | 3/2015 | Richards | B25F 1/04 |
| | | | | | 7/168 |
| 2007/0017072 | A1 | * | 1/2007 | Serio | F16B 7/042 |
| | | | | | 24/573.11 |

(Continued)

*Primary Examiner* — Paul T Chin
(74) *Attorney, Agent, or Firm* — Tarolli, Sundheim, Covell & Tummino LLP

(57) ABSTRACT

A multipurpose handle and workpiece attachment tool (10, 12, 14) has a handle (16) and a workpiece (18). The handle has a grip portion (20) at a first end and a first attachment portion (22) at a second end. The workpiece has a second attachment portion (24) adapted to engage the first attachment portion of the handle. The first attachment portion has a sleeve (26) with an opening (30) which can receive the second attachment portion. The sleeve has a clip-lock aperture (32) and a cam-lock aperture (34), and there is a cam clamping lever (28) pivotally connected to the sleeve. The cam clamping lever has an eccentric cam surface (36) which can be moved into and out of the cam-lock aperture by operating the cam clamping lever. The second attachment portion has a first spring loaded button (38*a*, 38*b*, 42*a*) which is spring biased to move into the clip-lock aperture when the first and second attachment portions are engaged, and also has a cam engaging surface (40) against which the eccentric cam surface is pressed when the cam clamping lever is operated. In this way, the handle and the workpiece assume a locked configuration.

20 Claims, 29 Drawing Sheets

(56) References Cited

U.S. PATENT DOCUMENTS

2010/0263219 A1\* 10/2010 Kempker .............. B26B 25/005
  83/13
2018/0281169 A1\* 10/2018 Cromartie ................ B25G 1/04

\* cited by examiner

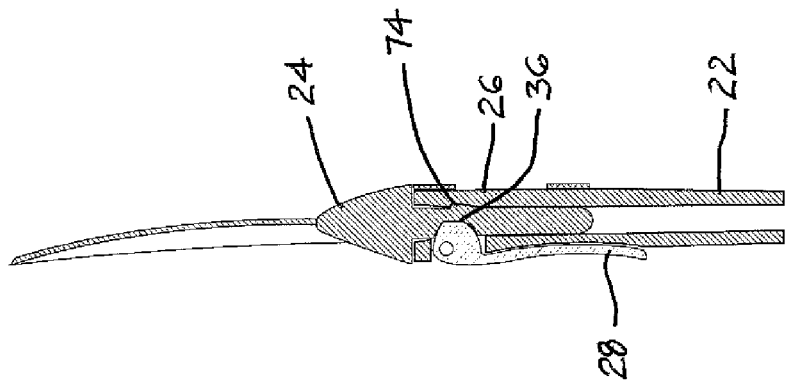
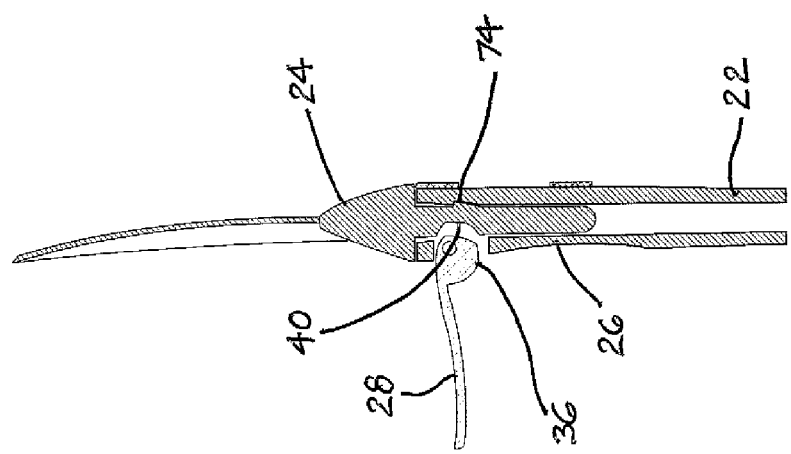
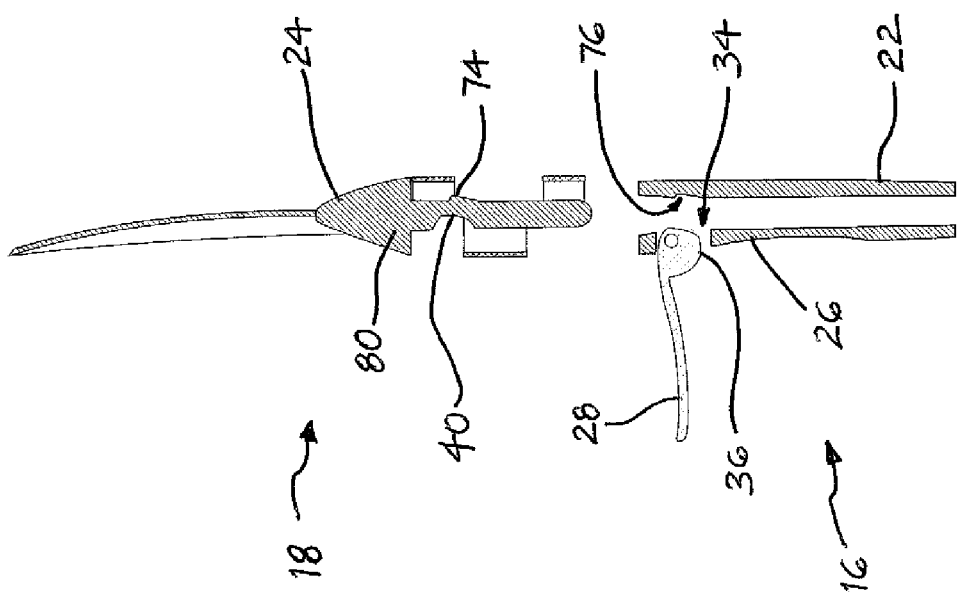

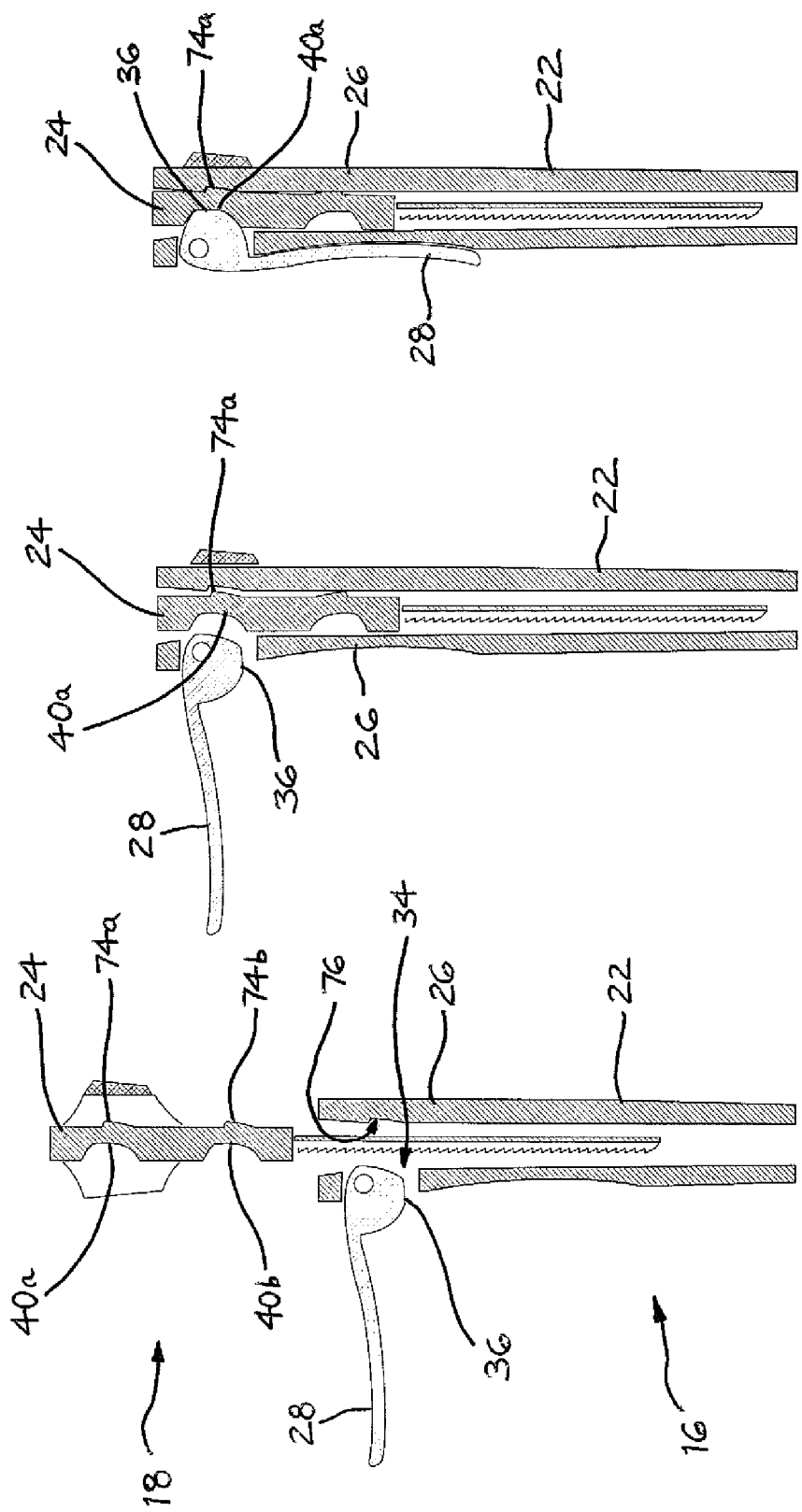

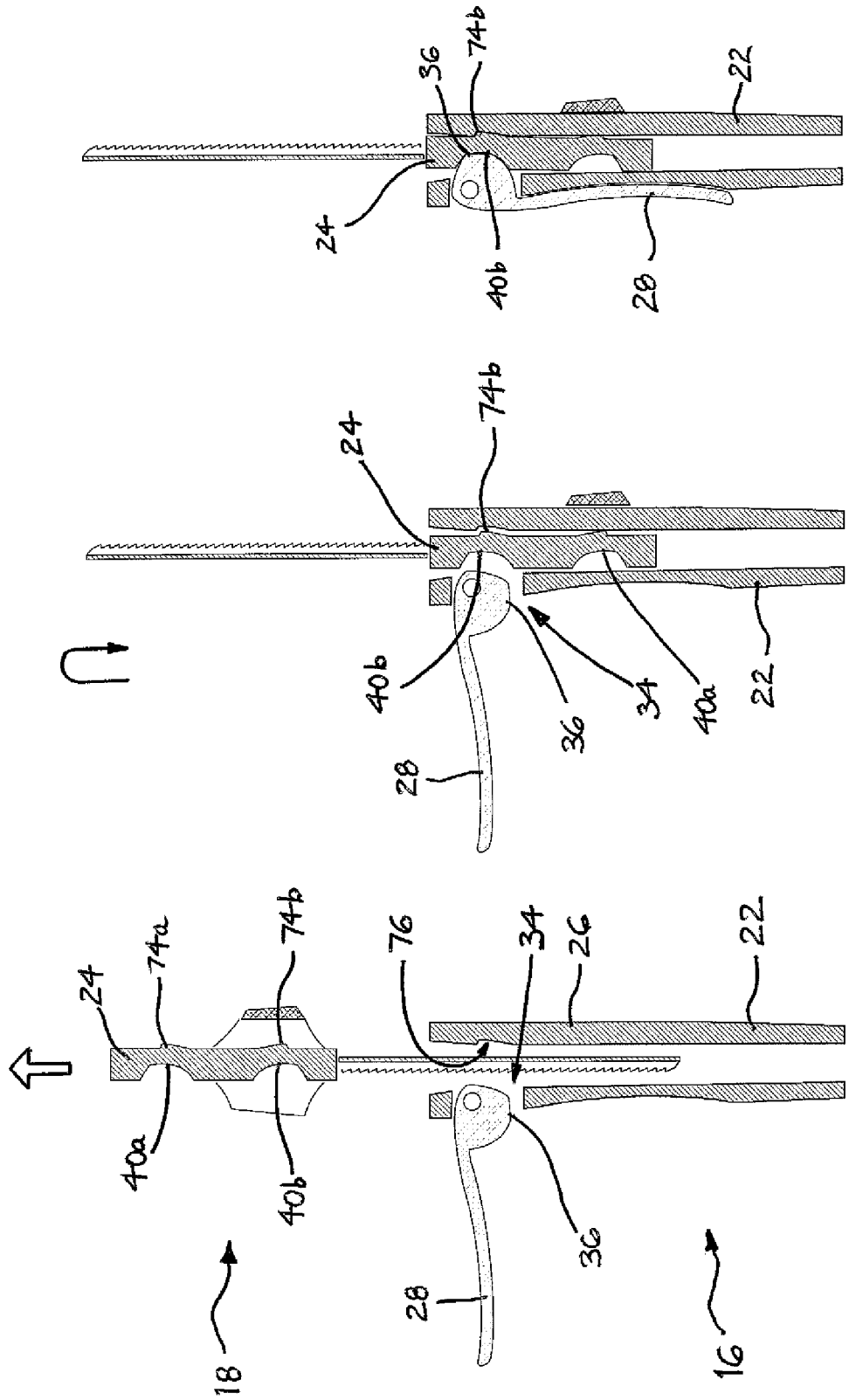

MULTIPURPOSE HANDLE AND WORKPIECE ATTACHMENT TOOL

TECHNICAL FIELD

The present invention relates to hand tools and, in particular, to a multipurpose handle and workpiece attachment tool for use in the camping and outdoor recreational fields.

BACKGROUND ART

There has been a long felt need in the camping and outdoor recreational markets for a multipurpose handle and workpiece attachment tool which is strong, reliable and easy to operate under a wide range of conditions, and that can function as an axe, saw and shovel, as well as a hammer and a hook.

Known multipurpose handle and workpiece attachment tools utilize a variety of different mechanisms or assemblies for attaching a common handle to a selected workpiece. In many cases, the mechanisms involve components, such as hitch pins and thumb screw bars, which are separate from either the handle or the workpiece, and need to be fitted to the tool after the handle and workpiece are attached together.

In other cases, where no such separate components are utilized, the handle and selected workpiece have built-in structures which enable them to be attached together, but these generally result in a limited range of tools and in their effectiveness being limited due to structural constraints.

DISCLOSURE OF INVENTION

It is, therefore, an object of the present invention to provide a multipurpose handle and workpiece attachment tool which overcomes, or at least ameliorates the shortcomings of the aforementioned prior art, or at least provides a useful alternative.

According to the present invention, there is provided a multipurpose handle and workpiece attachment tool comprising:
- (a) a handle having a grip portion at a first end and a first attachment portion at a second end,
- (b) a workpiece having a second attachment portion adapted to engage the first attachment portion of the handle, wherein
- (c) the first attachment portion of the handle comprises a sleeve having an opening through which the second attachment portion is received, a clip-lock aperture in the sleeve, and a cam clamping lever having an eccentric cam surface which is adapted to be moved into and out of a cam-lock aperture in the sleeve by operation of the cam clamping lever, and
- (d) the second attachment portion of the workpiece comprises a first spring loaded button which is spring biased to move into the clip-lock aperture when the first and second attachment portions are engaged, and a cam engaging surface against which the eccentric cam surface is pressed when the cam clamping lever is operated to move the eccentric cam surface into the cam-lock aperture of the sleeve, whereby the handle and the workpiece assume a locked configuration.

In a first embodiment of the workpiece, the workpiece is a shovel blade, and the first and second attachment portions are engaged so that the shovel blade extends linearly from the handle for use of the tool as a shovel.

In a second embodiment of the workpiece, the workpiece is a combined axe head and saw blade in which the axe head extends perpendicularly from the saw blade, and the second attachment portion further comprises a second spring loaded button.

In a preferred form of this second embodiment, the first and second attachment portions are engaged so that the axe head extends perpendicularly from the handle for use of the tool as an axe, and the eccentric cam surface is pressed against the cam engaging surface which is on opposite sides of the second spring loaded button.

In this form, the saw blade is located in an internal cavity of the handle, which includes the sleeve.

In an alternative preferred form of this second embodiment, the first and second attachment portions are engaged so that the saw blade extends linearly from the handle for use of the tool as a saw, and the eccentric cam surface is pressed against the cam engaging surface which is on opposite sides of the second spring loaded button.

In this form, the axe head extends perpendicularly from the handle.

In a preferred form of the present invention, the first attachment portion has alignment slots formed along the sleeve and the second attachment portion has alignment projections which slidably engage the alignment slots for aligning of the first and second attachment portions when they are engaged.

In another preferred form of the present invention, the cam-lock aperture is located nearer to the opening of the sleeve than is the clip-lock aperture.

There has been thus outlined, rather broadly, the more important features of the invention in order that the detailed description thereof that follows may be better understood and put into practical effect, and in order that the present contribution to this technical field may be better appreciated.

There are additional features of the invention that will be described hereinafter. As such, those skilled in this technical field will appreciate that the conception, upon which the disclosure is based, may be readily utilized as the basis for designing other structures, assemblies, process steps and system configurations for carrying out the object of the present invention. It is important, therefore, that the broad outline of the invention described above be regarded as including such equivalent features insofar as they do not depart from the spirit and scope of the present invention.

SUMMARY OF THE DRAWINGS

FIG. 16 is a schematic sectional side view of a first attachment portion of a handle and a second attachment portion of a shovel blade workpiece of the present invention which are arranged for forming a shovel, the first and second attachment portions being shown before they are engaged together for the purpose of showing the operation of the cam clamping lever.

FIG. 17 is a view similar to that of FIG. 16 but showing the first attachment portion of the handle and the second attachment portion of the shovel blade workpiece after being initially engaged together in a first step for forming a shovel of the present invention.

FIG. 18 is a view similar to that of FIG. 17 but showing the first attachment portion of the handle and the second attachment portion of the shovel blade workpiece after being finally engaged together in a second step to form a shovel of the present invention.

FIG. 28 is a schematic sectional side view of a first attachment portion of a handle and a second attachment portion of a combined axe head and saw blade workpiece of the present invention which are arranged for forming an axe, the first and second attachment portions being shown before they are engaged together for the purpose of showing the operation of the cam clamping lever.

FIG. 29 is a view similar to that of FIG. 28 but showing the first attachment portion of the handle and the second attachment portion of the combined workpiece after being initially engaged together in a first step for forming an axe of the present invention.

FIG. 30 is a view similar to that of FIG. 29 but showing the first attachment portion of the handle and the second attachment portion of the combined workpiece after being finally engaged together in a second step to form an axe of the present invention.

FIG. 37 is a schematic sectional side view of a first attachment portion of a handle and a second attachment portion of a combined axe head and saw blade workpiece of the present invention in which the combined workpiece is being released from the handle and, instead of being used as an axe, the tool will be used as a saw.

FIG. 38 is a view similar to that of FIG. 37 but showing the first attachment portion of the handle and the second attachment portion of the combined workpiece after being initially engaged together in a first step for forming a saw of the present invention, and for the purpose of showing the operation of the cam clamping lever.

FIG. 39 is a view similar to that of FIG. 38 but showing the first attachment portion of the handle and the second attachment portion of the combined workpiece after being finally engaged together in a second step to form a saw of the present invention.

DETAILED DESCRIPTION OF THE INVENTION

Figure 1:
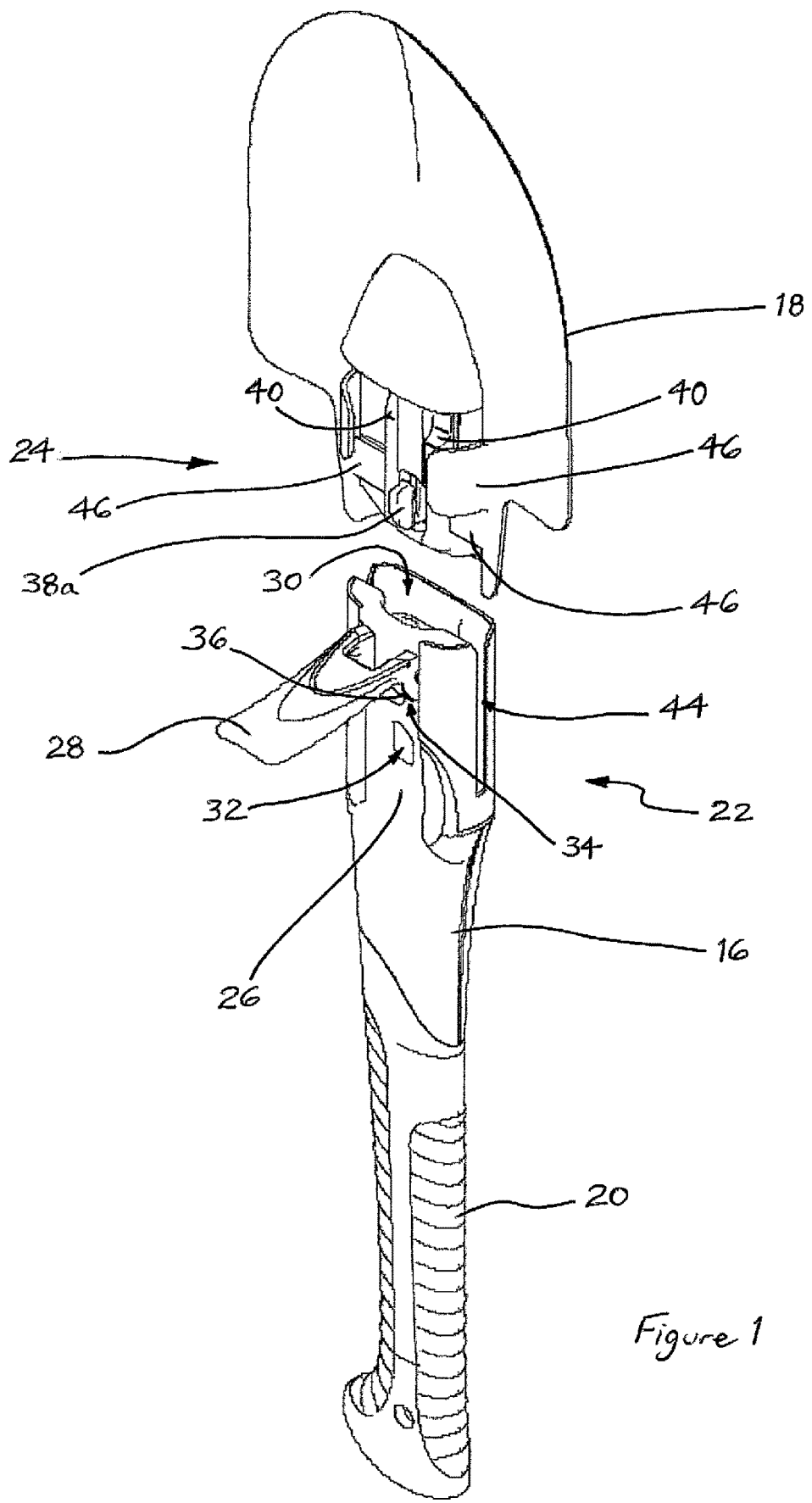
FIG. 1 is an isometric view of a shovel blade and a handle shown separated and about to be attached together to form a multipurpose handle and workpiece attachment tool according to a first embodiment of the present invention, which is a shovel.
Figure 2:
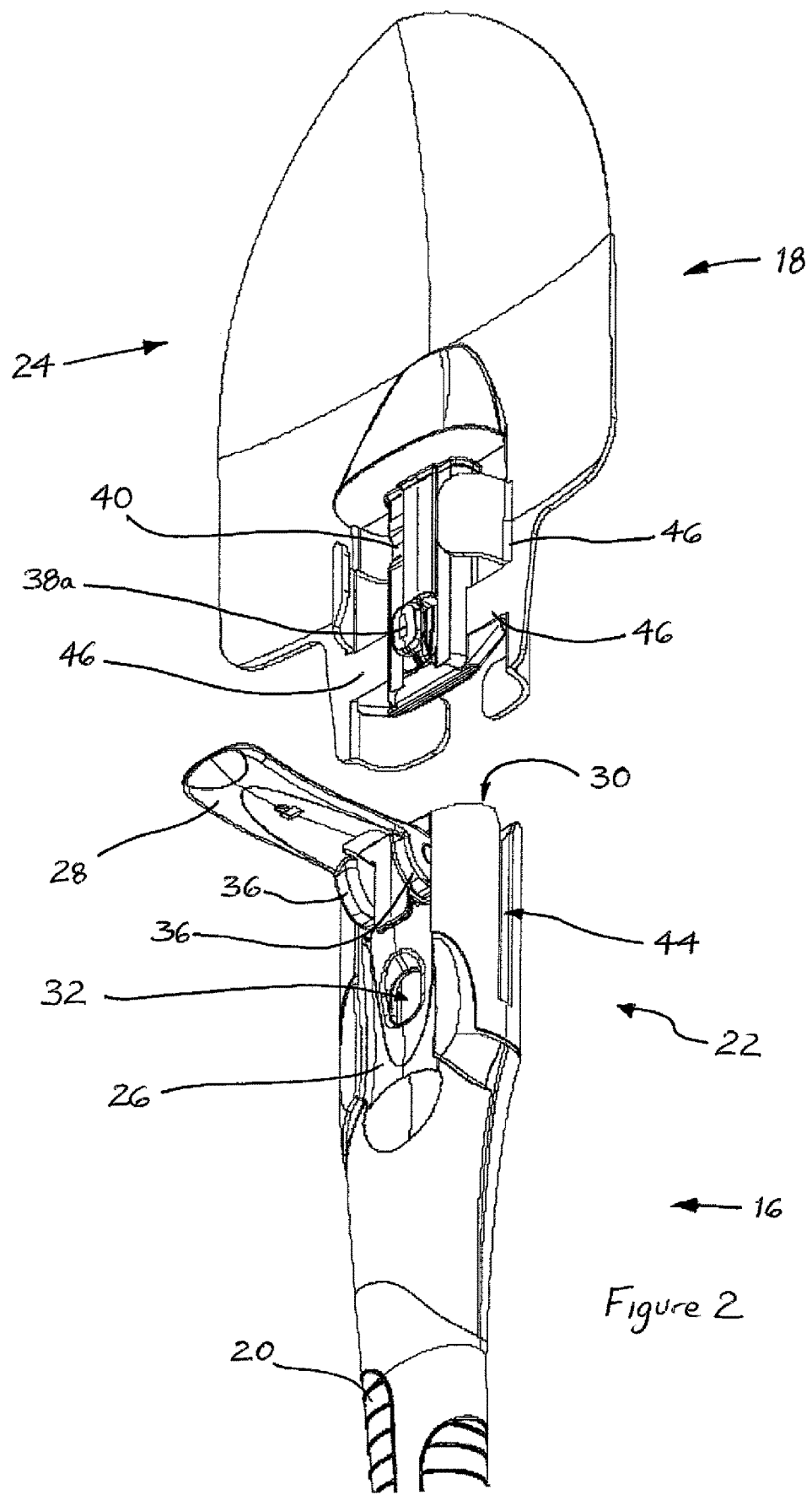
FIG. 2 is an enlarged isometric view of the shovel blade and a top part of the handle as shown in FIG. 1.
Figure 3:
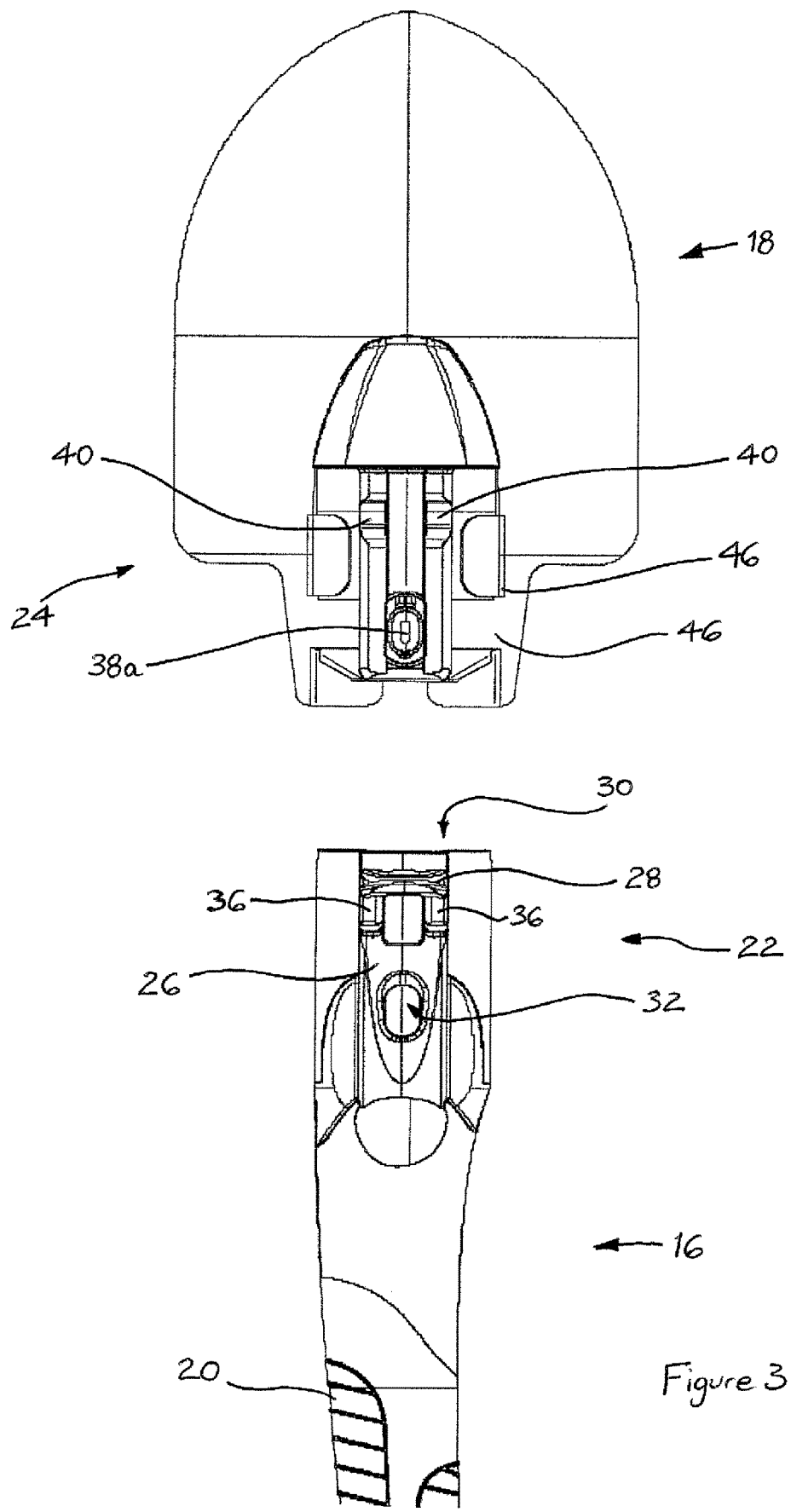
FIG. 3 is a side elevation view of the shovel blade and a top part of the handle as shown in FIGS. 1 and 2.
Figure 4:
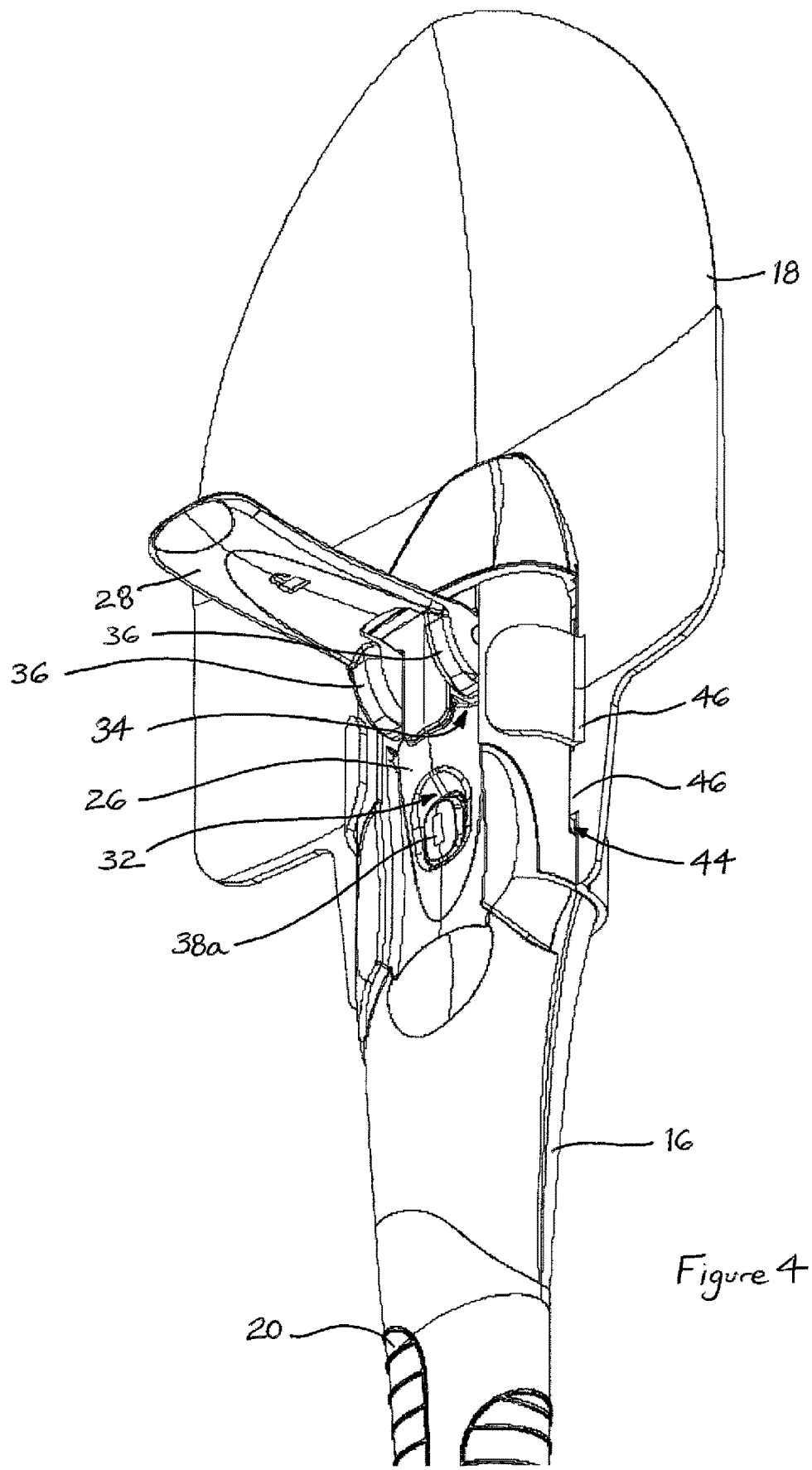
FIG. 4 is an enlarged isometric view of the shovel blade and a top part of the handle of FIGS. 1 to 3 shown after being initially attached together in a first step.
Figure 5:
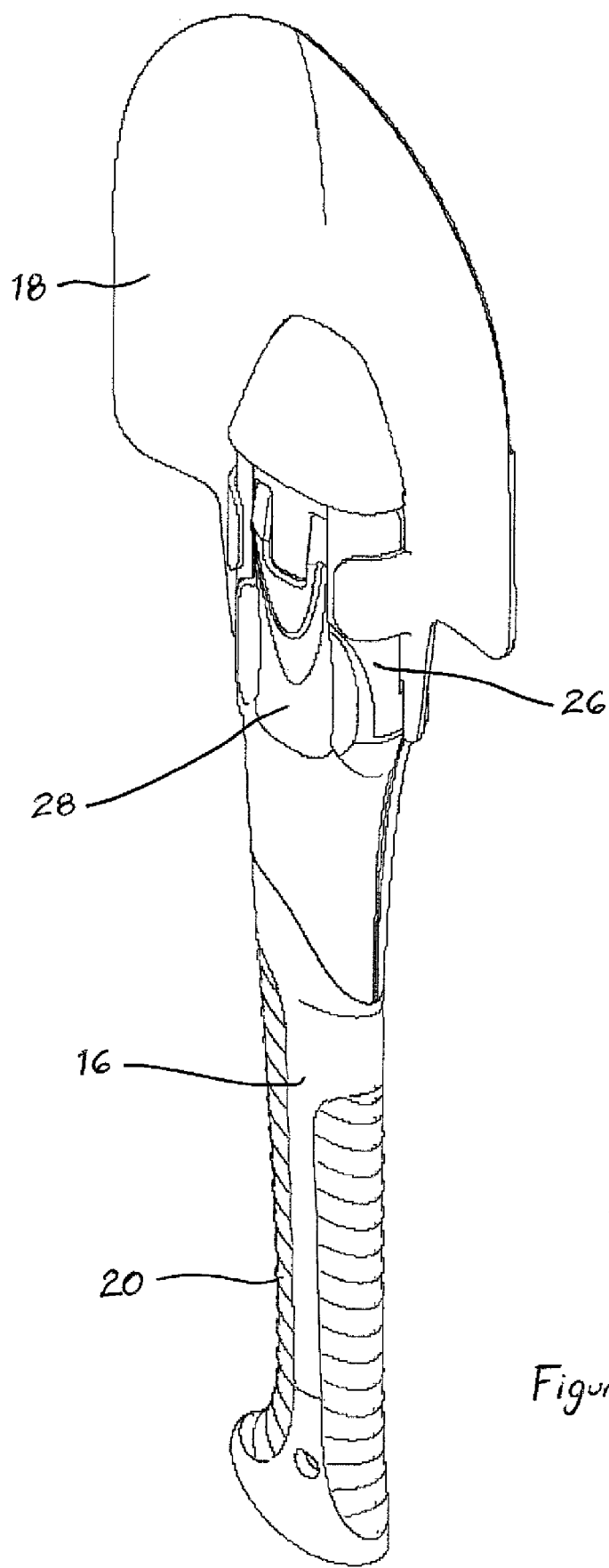
FIG. 5 is an isometric view of a shovel formed by the shovel blade and the handle shown in FIGS. 1 to 4 after being finally attached together in a second step.
Figure 6:
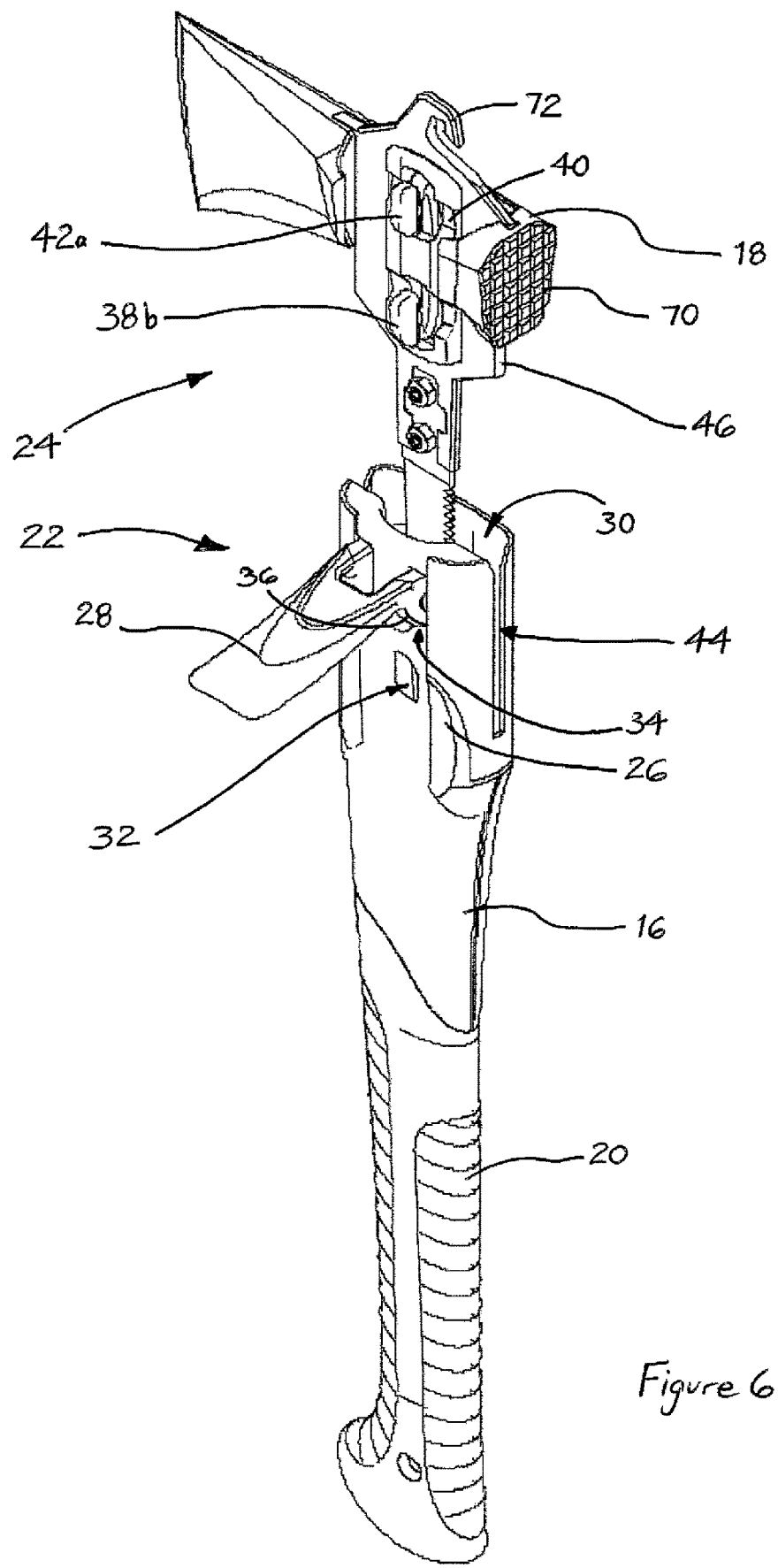
FIG. 6 is an isometric view of a combined axe head and saw blade and a handle shown partly separated and about to be attached together to form a multipurpose handle and workpiece attachment tool according to a second embodiment of the present invention, which is an axe.
Figure 7:
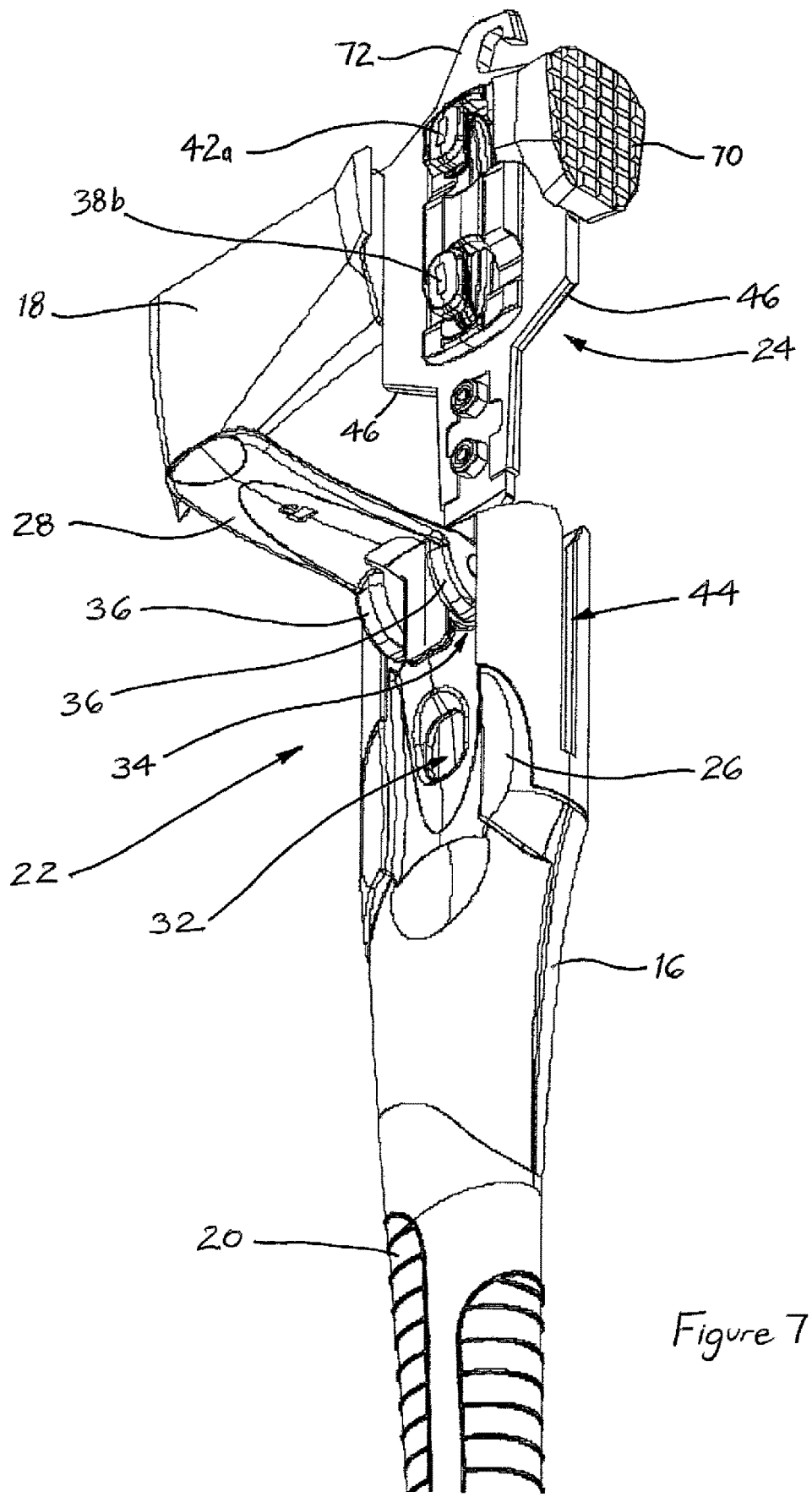
FIG. 7 is an enlarged isometric view of the combined axe head and saw blade and a top part of the handle as shown in FIG. 6.
Figure 8:
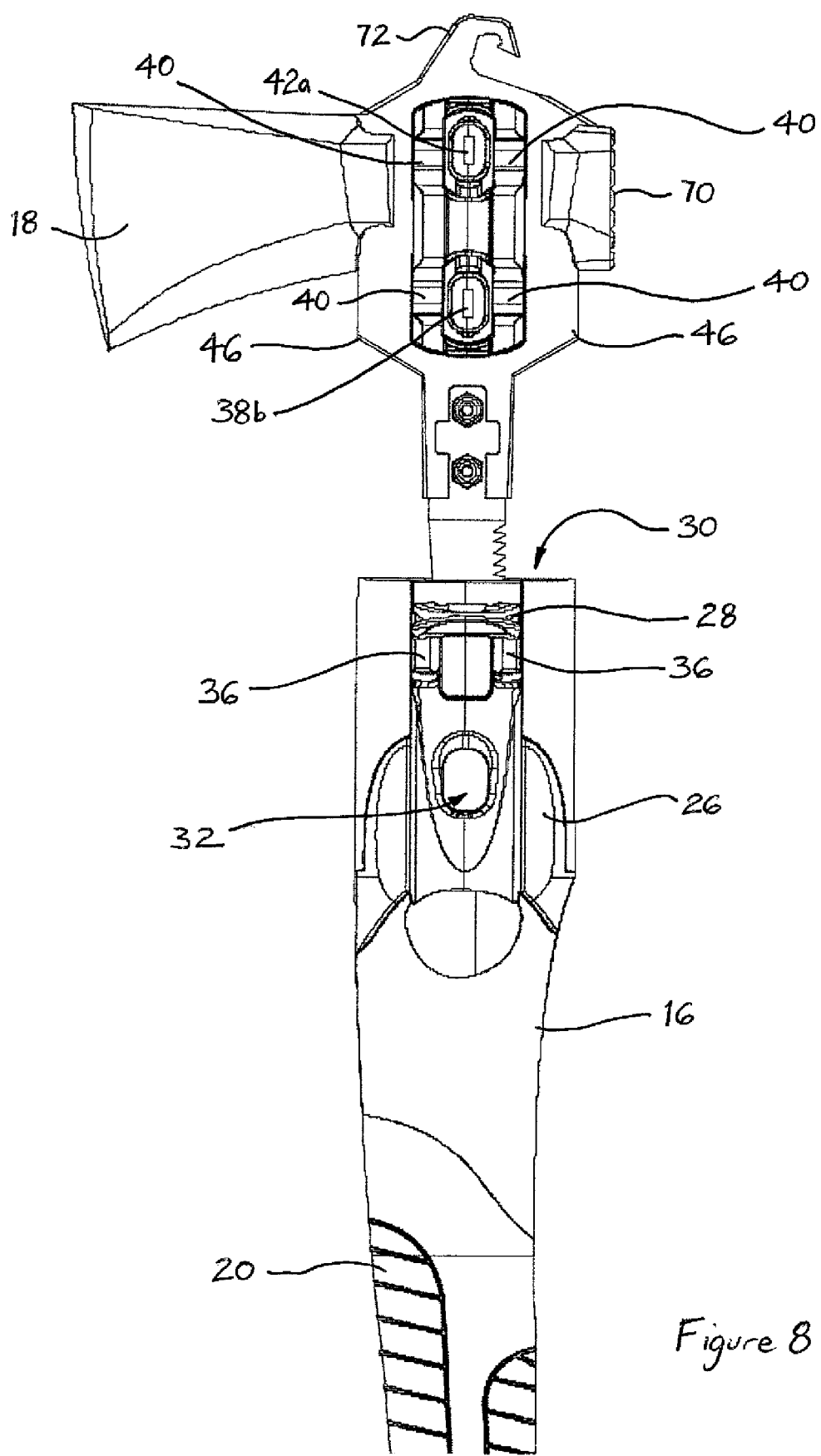
FIG. 8 is a side elevation view of the combined axe head and saw blade and a top part of the handle as shown in FIGS. 6 and 7.
Figure 9:
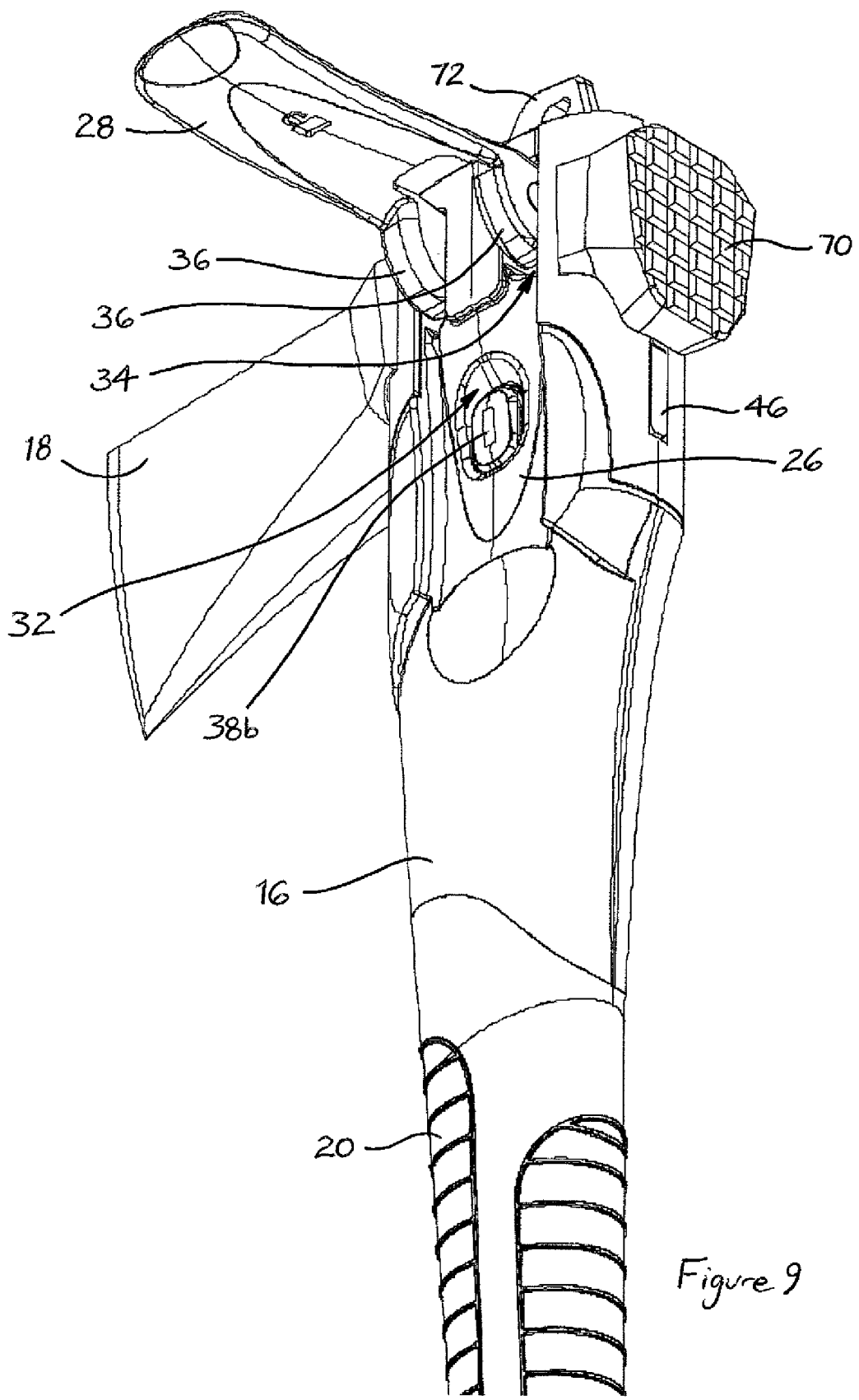
FIG. 9 is an enlarged isometric view of the combined axe head and saw blade and a top part of the handle of FIGS. 6 to 8 shown after being initially attached together in a first step.
Figure 10:
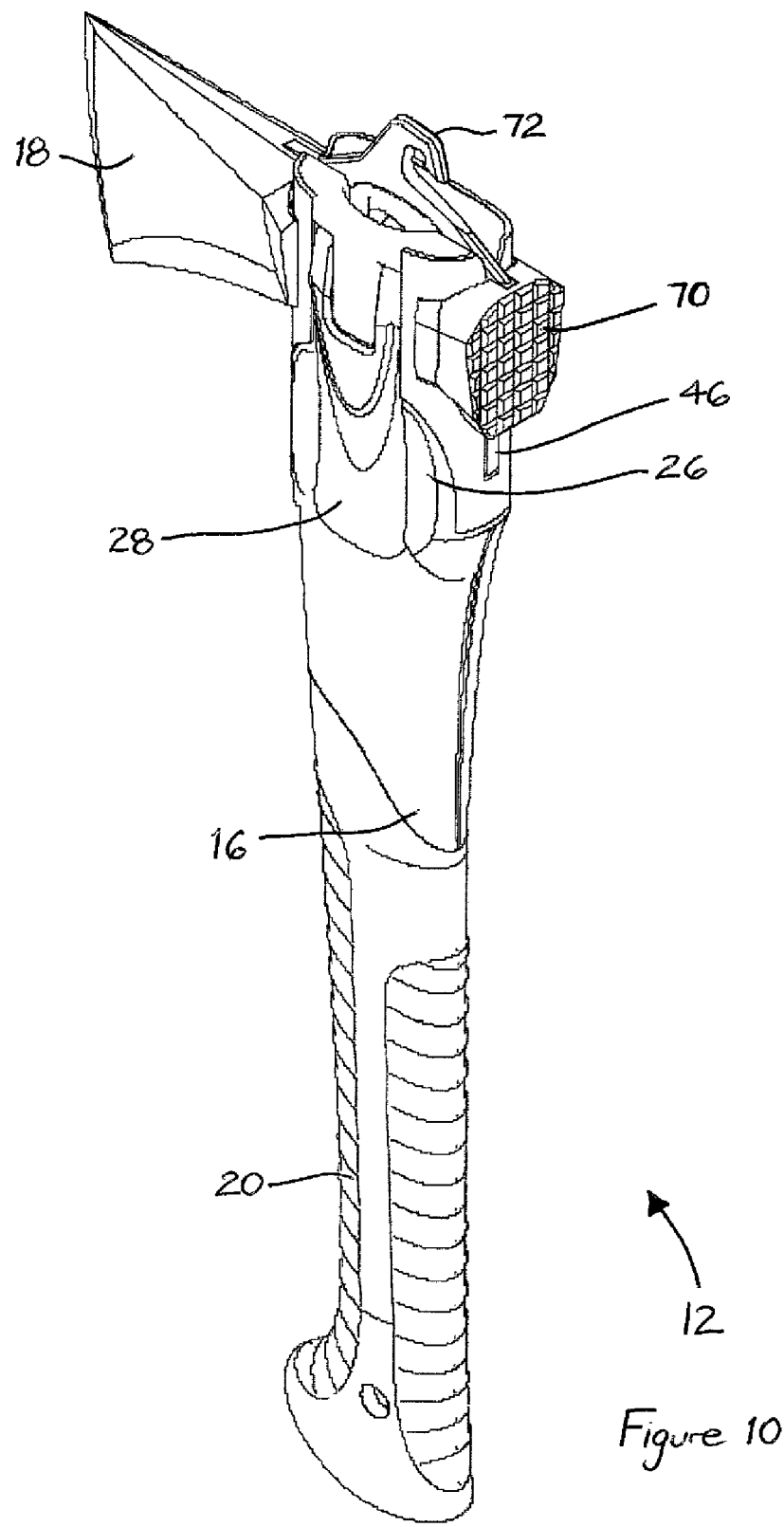
FIG. 10 is an isometric view of an axe formed by the combined axe head and saw blade and the handle shown in FIGS. 6 to 9 after being finally attached together in a second step.
Figure 11:
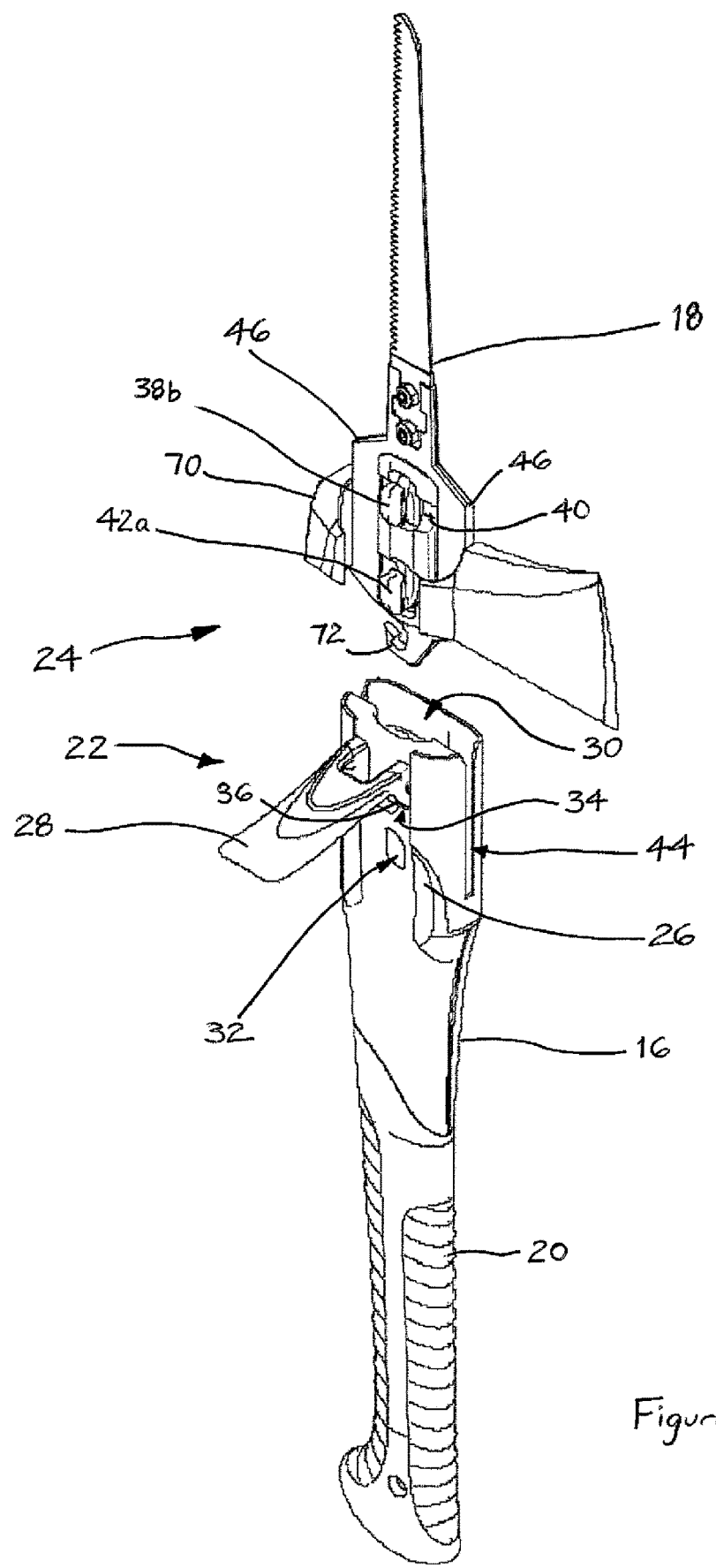
FIG. 11 is an isometric view of a combined axe head and saw blade and a handle shown separated and about to be attached together to form a multipurpose handle and workpiece attachment tool according to a third embodiment of the present invention, which is a saw.
Figure 12:
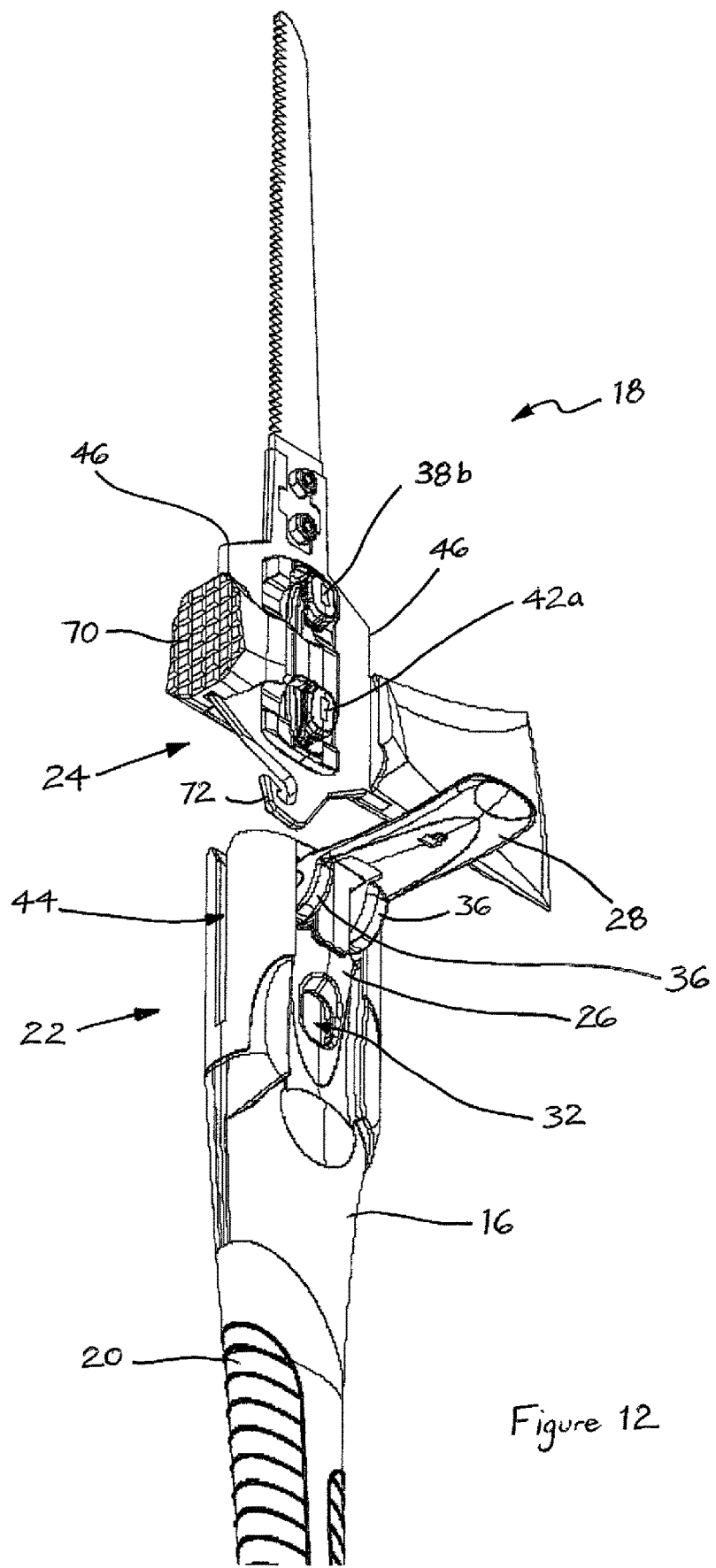
FIG. 12 is an enlarged isometric view of the combined axe head and saw blade and a top part of the handle as shown in FIG. 11.
Figure 13:
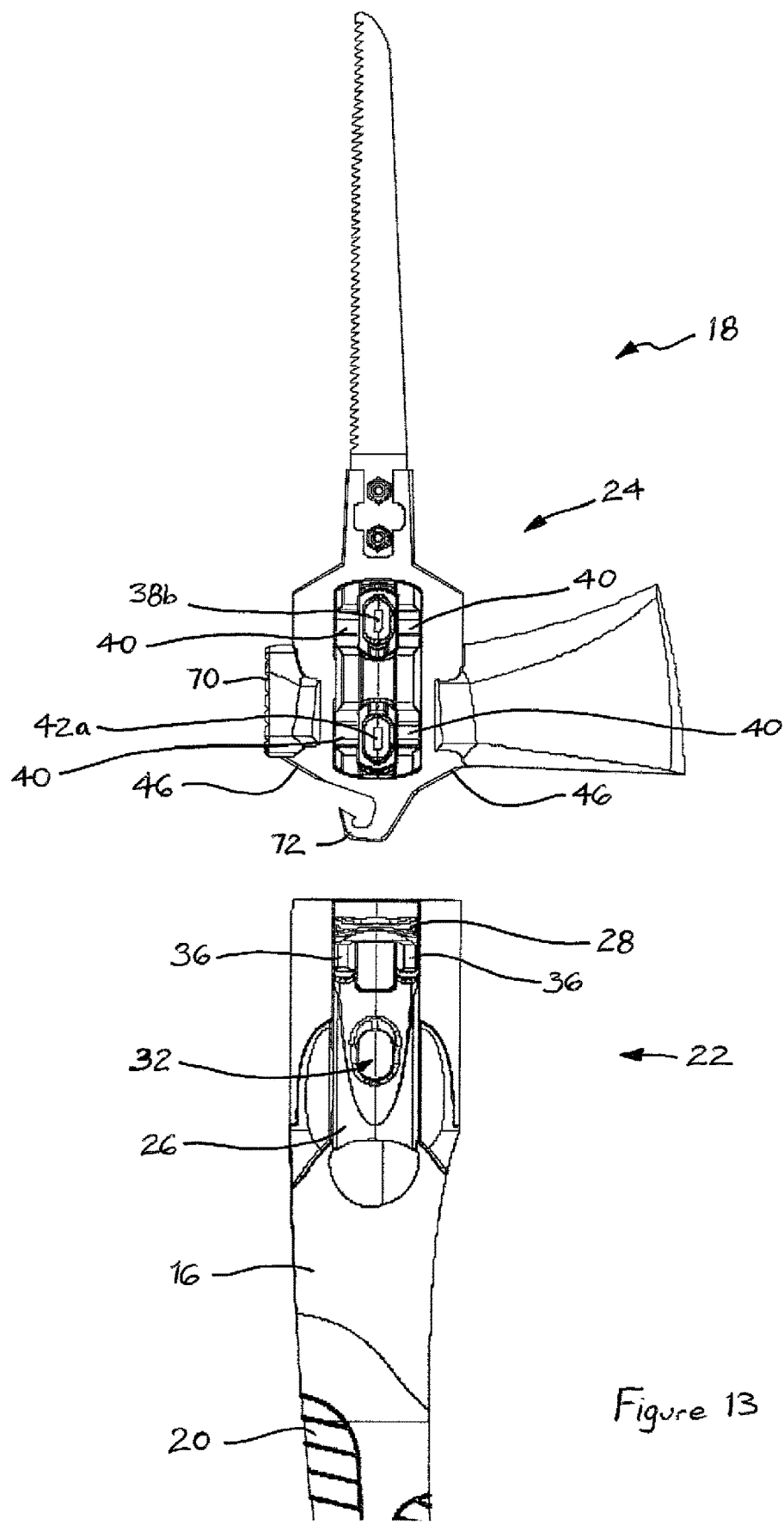
FIG. 13 is a side elevation view of the combined axe head and saw blade and a top part of the handle as shown in FIGS. 11 and 12.
Figure 14:
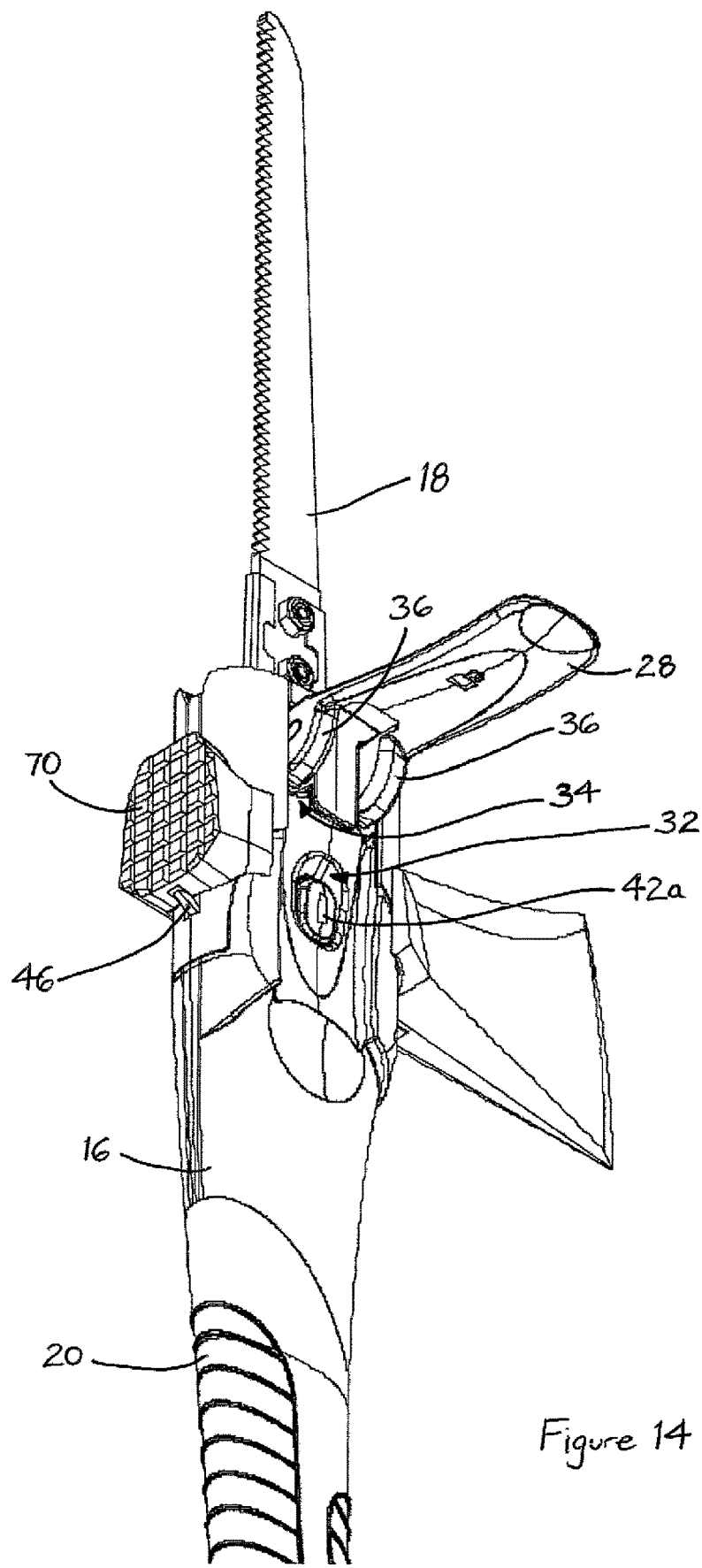
FIG. 14 is an enlarged isometric view of the combined axe head and saw blade and a top part of the handle of FIGS. 11 to 13 shown after being initially attached together in a first step.
Figure 15:
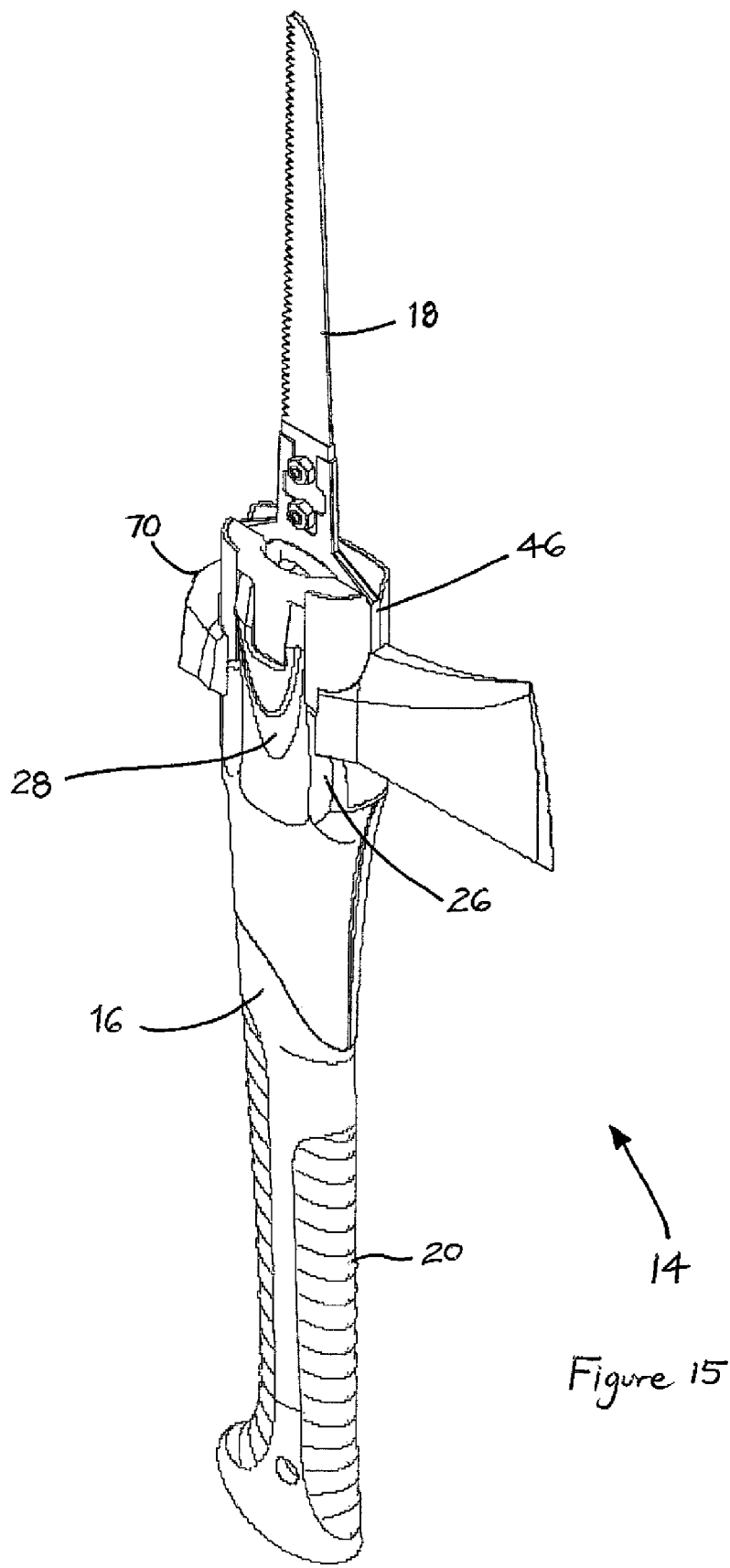
FIG. 15 is an isometric view of a saw formed by the combined axe head and saw blade and the handle shown in FIGS. 11 to 14 after being finally attached together in a second step.

The three multipurpose handle and workpiece attachment tools 10, 12 and 14 shown (in finally attached form) in FIGS. 5, 10 and 15, respectively, each have a handle 16 and a workpiece 18. FIG. 5 shows an assembled shovel 10, FIG. 10 shows an assembled axe 12, and FIG. 15 shows an assembled saw 14. The following description uses identical numerals to refer to features which are common to all three embodiments shown in FIGS. 1 to 45.

The handle 16 has a grip portion 20 at a first end and has a first attachment portion 22 at a second end. The workpiece 18 has a second attachment portion 24 adapted to engage the first attachment portion 22 of the handle 16.

The first attachment portion 22 of the handle 16 has a sleeve 26 and a cam clamping lever 28. The sleeve 26 has an opening 30 through which the second attachment portion 24 is received. The sleeve 26 also has a clip-lock aperture 32 and a cam-lock aperture 34.

The cam clamping lever 28 has an eccentric cam surface 36 which is adapted to be moved into and out of the cam-lock aperture 34 in the sleeve 26 by operation of the cam clamping lever 28. The lever 28 is, in this case, pivotally connected to the sleeve 26.

The second attachment portion 24 of the workpiece 18 has a first spring loaded button 38, 42 and a cam engaging surface 40. When the tool 10 is for use as a shovel (see FIGS. 1 to 5), the first spring loaded button is referred to hereinafter by the numeral 38a. When the tool 12 is for use as an axe (see FIGS. 6 to 10), the first spring loaded button is referred to hereinafter by the numeral 38b. When the tool 14 is for use as a saw (see FIGS. 11 to 15), the first spring loaded button is referred to hereinafter by the numeral 42a.

The first spring loaded button 38a, 38b and 42a is spring biased to move into the clip-lock aperture 32 when the first and second attachment portions 22 and 24 are engaged.

The eccentric cam surface 36 of the cam clamping lever 28 is pressed tightly against the cam engaging surface 40 when the cam clamping lever 28 is operated to move the eccentric cam surface 36 into the cam-lock aperture 34 of the sleeve 26. This results in the handle 16 and the workpiece 18 assuming a locked configuration in which the tool is ready for use.

In the embodiment shown in FIGS. 1 to 5, the workpiece 18 is a shovel blade, and the first and second attachment portions 22 and 24 are engaged so that the shovel blade extends linearly from the handle 16 for use of the tool as a shovel. The second attachment portion 24 of that workpiece 18 has a single spring loaded button 38a.

In the embodiment shown in FIGS. 6 to 10, the workpiece 18 is a combined axe head and saw blade in which the axe head extends perpendicularly from the saw blade. The second attachment portion 24 of that workpiece has two spring loaded buttons 38b and 42a.

In this embodiment, the first and second attachment portions 22 and 24 are engaged so that the axe head extends perpendicularly from the handle 16 for use of the tool as an axe, and the eccentric cam surface 36 is pressed against the cam engaging surface 40 which is on opposite sides of the spring loaded button 42a.

The saw blade, in the embodiment shown in FIGS. 6 to 10, is located in an internal cavity of the handle 16, which includes the sleeve 26.

In the embodiment shown in FIGS. 11 to 15, the workpiece 18 is the same combined axe head and saw blade as shown in FIGS. 6 to 10 in which the axe head extends perpendicularly from the saw blade. The second attachment portion 24 of that workpiece 18 therefore also has the same two spring loaded button 38b and 42a.

In this embodiment, the first and second attachment portions 22 and 24 are engaged so that the saw blade extends linearly from the handle 16 for use of the tool as a saw, and the eccentric cam surface 36 is pressed against the cam engaging surface 40 which is on opposite sides of the spring loaded button 38b.

The axe head, in the embodiment shown in FIGS. 11 to 15, extends perpendicularly from the handle 16.

In the embodiments shown in FIGS. 6 to 15, the combined axe head and saw blade also incorporates a hammer 70 (on the opposite side to the axe head) and a hook 72 (at the top of the axe head).

In each of the three embodiments shown in FIGS. 1 to 15, the first attachment portion 22 of the handle 16 has alignment slots 44 formed along the sleeve 26 and the second attachment portion 24 of the workpiece 18 has alignment projections 46 which slidably engage the alignment slots 44 for aligning of the first and second attachment portions 22 and 24 when they are engaged.

Also in each of the three embodiments shown in FIGS. 1 to 15, the cam-lock aperture 34 is located nearer to the opening 30 of the sleeve 26 than is the clip-lock aperture 32.

FIG. 16 schematically shows the first attachment portion 22 of the handle 16 and the second attachment portion 24 of the workpiece 18, in this case the shovel blade workpiece, in separate positions where they are about to be brought together to form a tool, in this case the shovel 10.

FIGS. 16 to 18 are sectioned to show the operation of the cam clamping lever 28. The cam engaging surface 40 of the second attachment portion 24 is a concavely shaped surface which is eccentrically contoured to match the contour of the eccentric cam surface 36 of the cam clamping lever 28. On the opposite side of the second attachment portion 24 to that of the cam engaging surface 40 is a tooth 74. In a corresponding position in the sleeve 26 of the first attachment portion 22 is a depression 76. As shown in FIGS. 17 and 18, the tooth 74 is caught and held tightly in the depression 76 when the eccentric cam surface 36 of the cam clamping lever 28 is pressed tightly against the cam engaging surface 40 after the first and second attachment portions 22, 24 have been slidably engaged and clamped together. This results in an extremely strong connection or lock which will prevent the workpiece 18 dislodging and sliding out from the handle 16 during rough or prolonged use.

Figure 21:
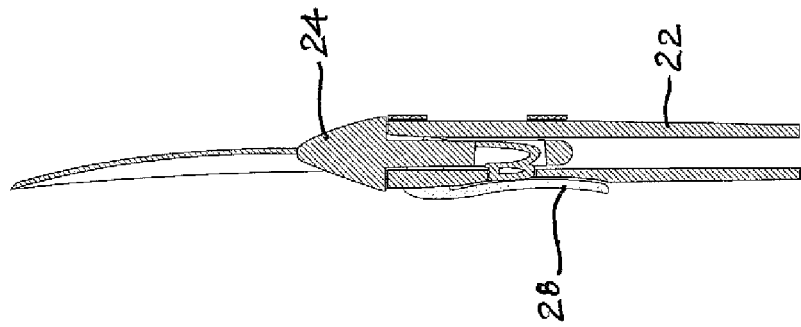
FIG. 21 is a view similar to that of FIG. 20 but showing the first attachment portion of the handle and the second attachment portion of the shovel blade workpiece after being finally engaged together in a second step to form a shovel of the present invention.
Figure 20:
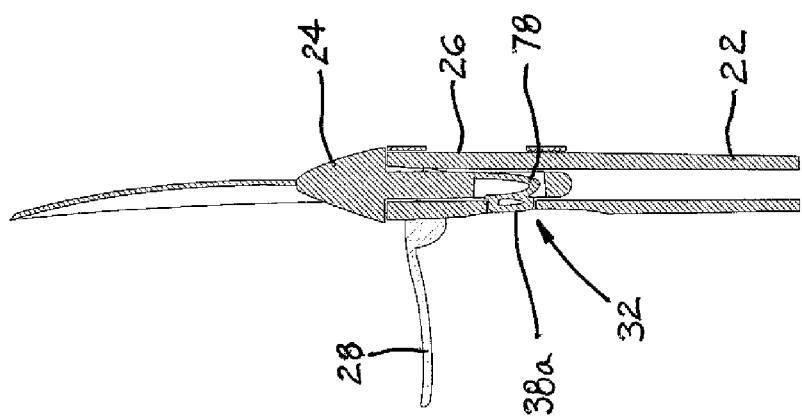
FIG. 20 is a view similar to that of FIG. 19 but showing the first attachment portion of the handle and the second attachment portion of the shovel blade workpiece after being initially engaged together in a first step for forming a shovel of the present invention.
Figure 19:
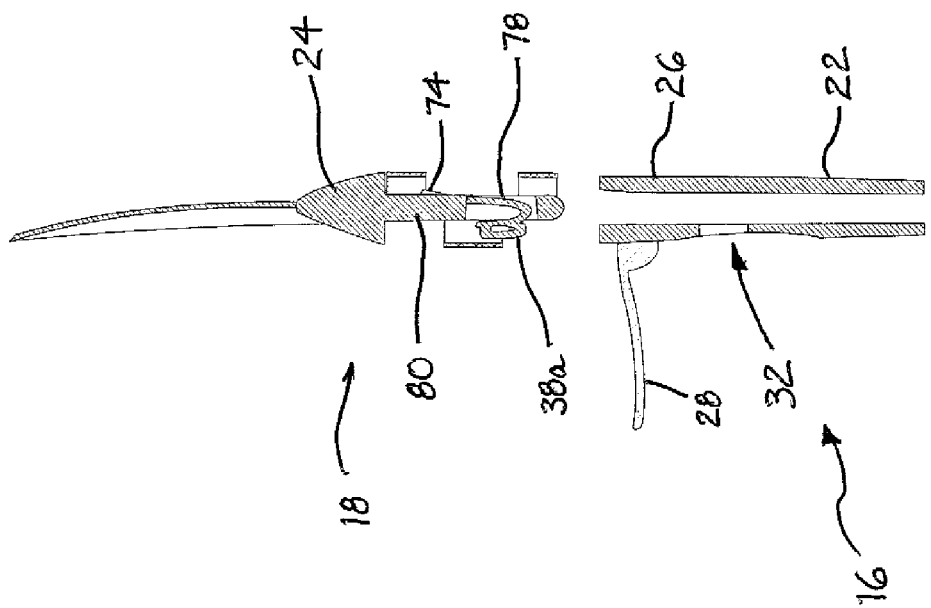
FIG. 19 is a schematic sectional side view of a first attachment portion of a handle and a second attachment portion of a shovel blade workpiece of the present invention which are arranged for forming a shovel, the first and second attachment portions being shown before they are engaged together for the purpose of showing the operation of the spring loaded button.

FIGS. 19 to 21 are similar to FIGS. 16 to 18 except that they have been sectioned differently to show the operation of the spring loaded button 38a. The button 38a is spring biased by a curved and flexible connecting member 78 which is connected, at its other end, to a main body 80 of the second attachment portion 24. Under this spring bias, the button 38a can move into the clip-lock aperture 32 and remain in that initially engaged position (as shown in FIGS. 20 and 21) until there is a requirement to disconnect the workpiece 18 from the handle 16. When there is such a requirement, a user operates the cam clamping lever 28 (by lifting it) to move the eccentric cam surface 36 out from the cam-lock aperture 34 of the sleeve 26 so that the handle 16 and the workpiece 18 no longer assume a locked configuration, and the user then presses on the button 38a to enable the workpiece 18 to be slid out from the handle 16.

Figure 22:
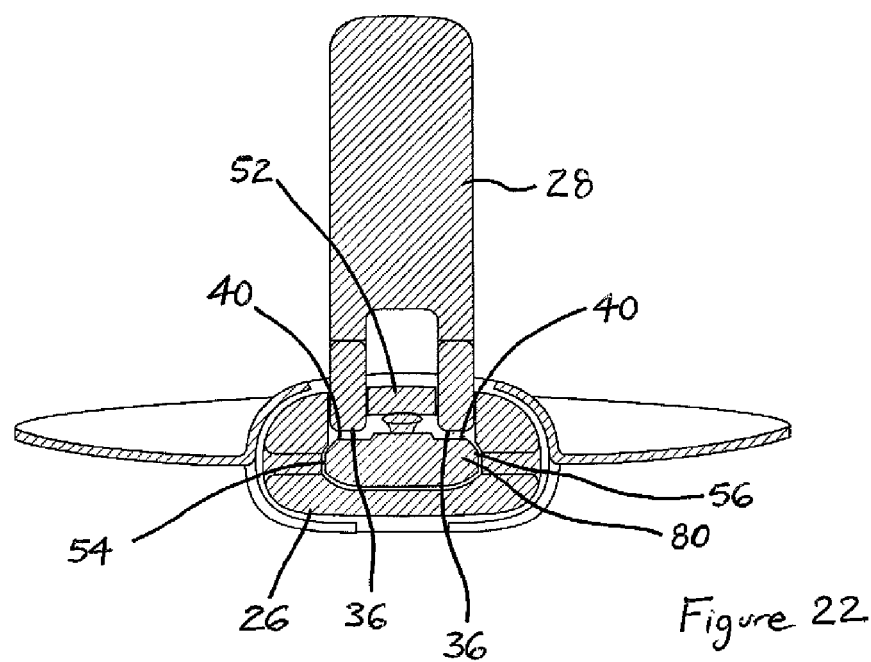
FIGS. 22 to 24 are schematic sectional top views of three consecutive stages of the second step of finally attaching together the shovel blade workpiece and the handle shown in FIGS. 1 to 4 to form the shovel shown in FIG. 5.
Figure 23:
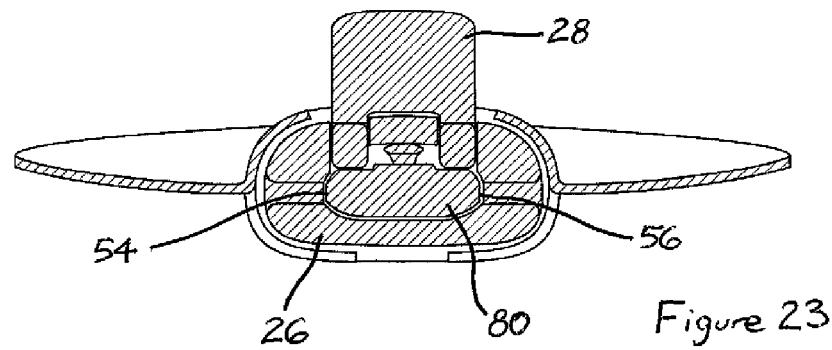
Figure 24:
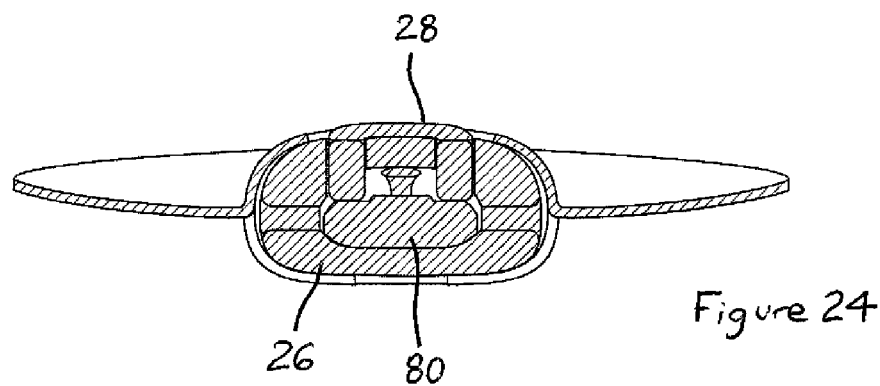

FIGS. 22 to 24 schematically and sectionally show three consecutive stages of the second step of finally attaching together the shovel blade workpiece 18 and the handle 16 to form the shovel 10.

As the cam clamping lever 28 is lowered (as shown from FIG. 22 to FIG. 24) from its raised position to its lowered position, its eccentric cam surface 36 progressively applies firmer pressure on the cam engaging surface 40, and the main body 80 is pushed and deformed laterally (in opposite outward directions aligned with the pivot axis of the pivot pin 52) such that the side edges 54, 56 of the main body 80 urge forcefully or bulge against the adjacent edges of the sleeve 26 of the handle 16.

This creates tension between the outside of the main body 80 and the inside of the sleeve 26. This bulging effect and the resulting increased tension provides an even firmer locking of the workpiece 18 to the handle 16.

Figure 25:
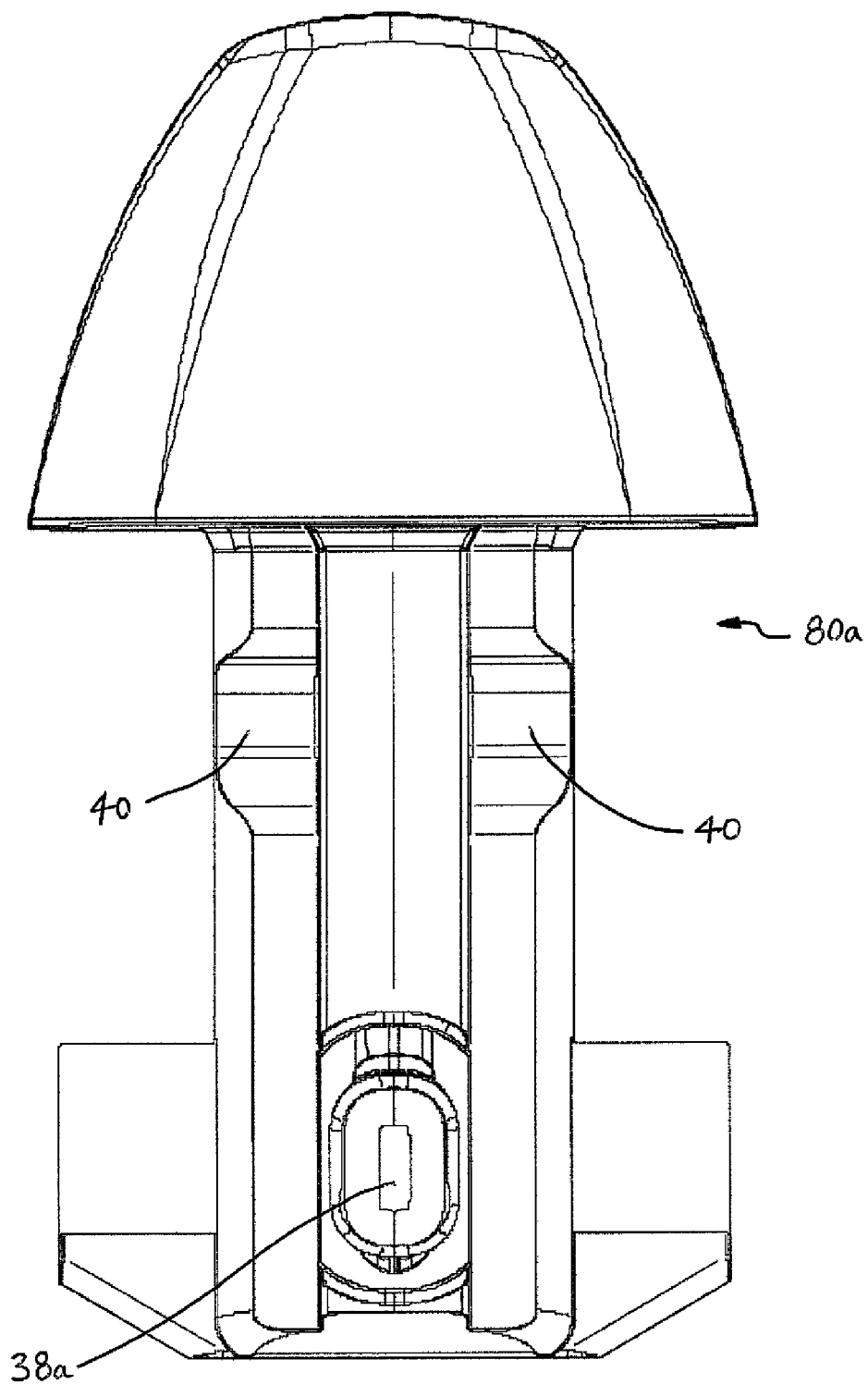
FIG. 25 is a front elevation view of a main body of the second attachment portion of the shovel blade workpiece of the present invention, the main body being used for forming a shovel.
Figure 26:
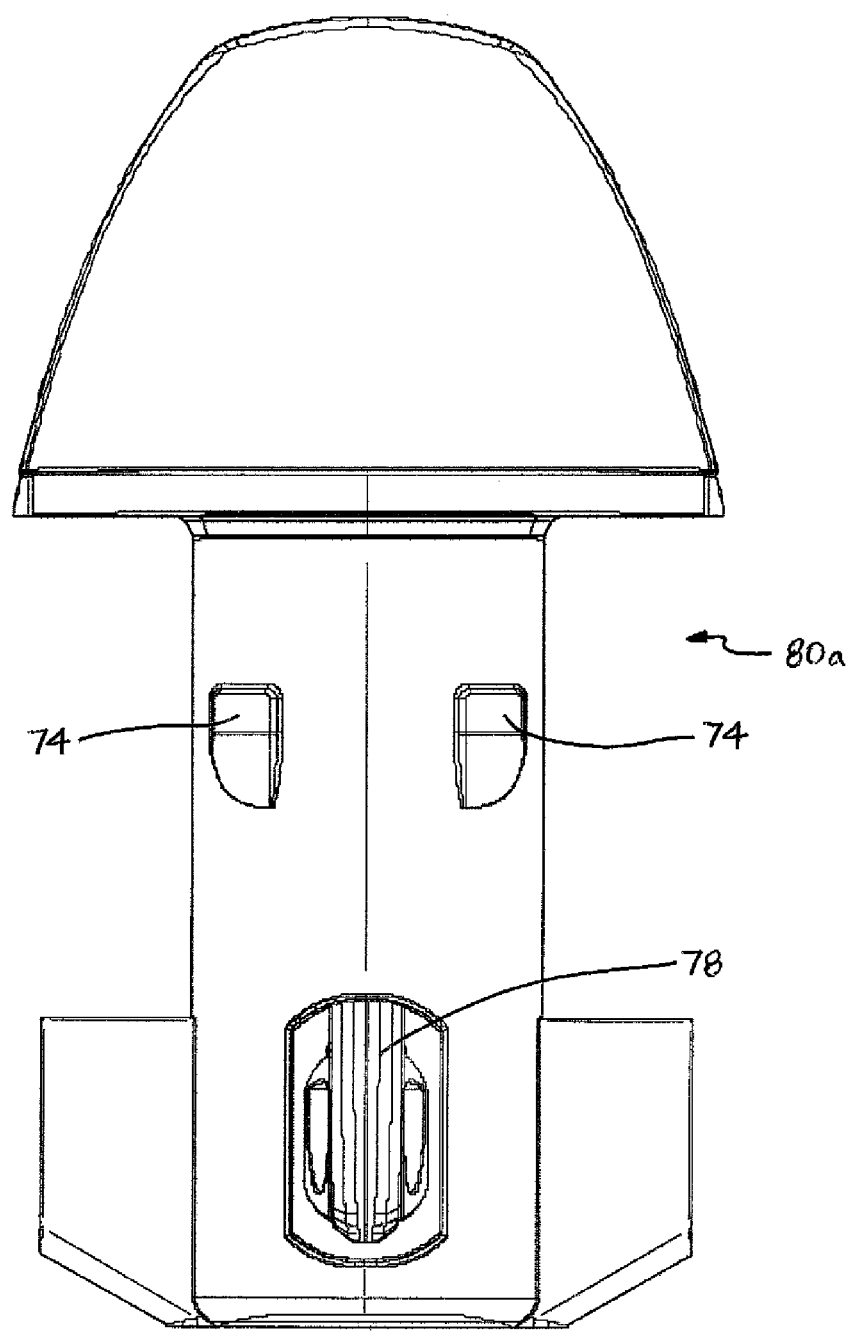
FIG. 26 is a rear elevation view of the main body shown in FIG. 25.
Figure 27:
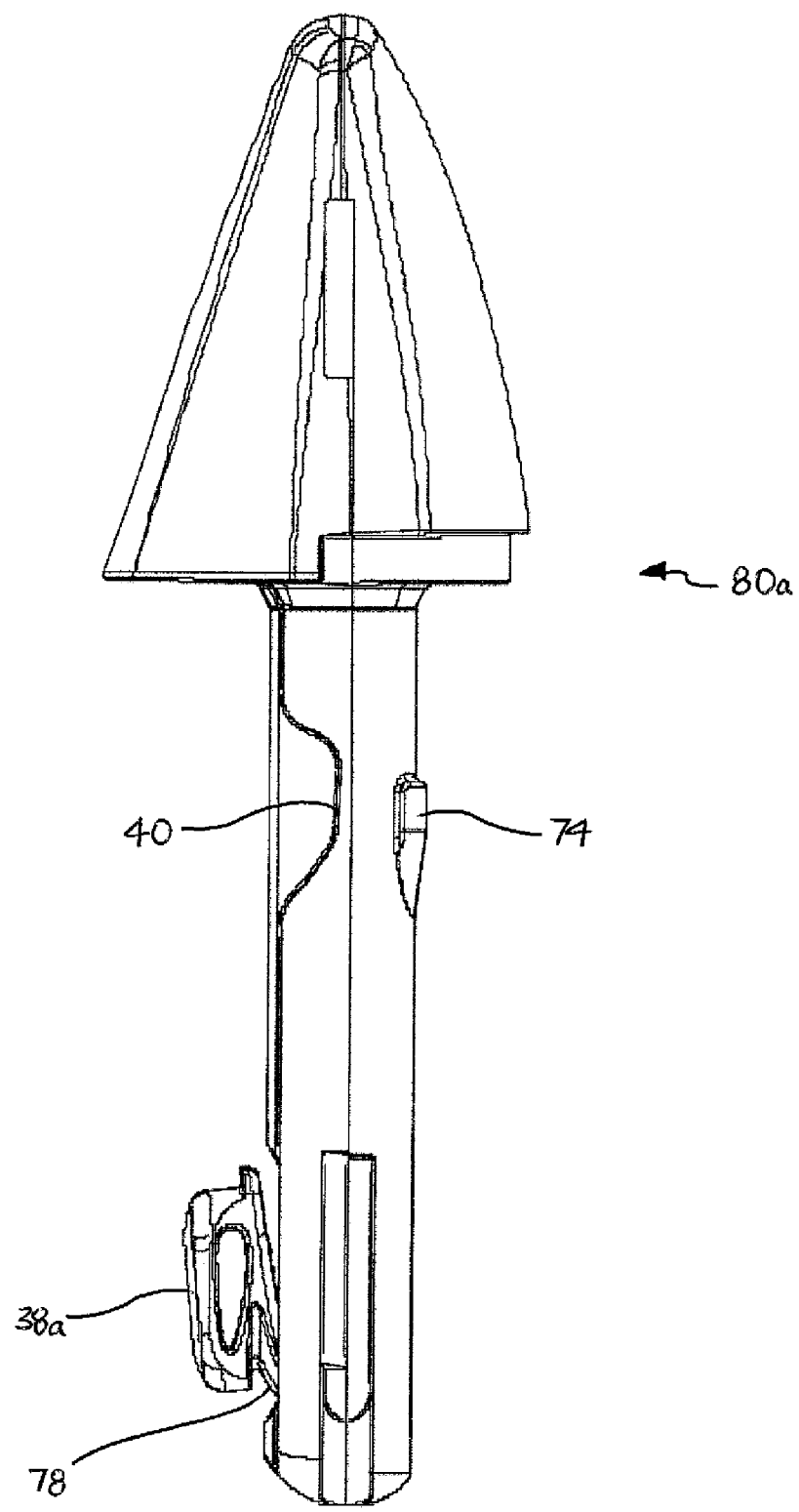
FIG. 27 is a right side elevation view of the main body shown in FIG. 25.

FIGS. 25 to 27 show the main body 80a of the second attachment portion 24 of the shovel blade workpiece 18 in isolated front, rear, and right side views, respectively. FIG. 25 clearly shows that there is a single spring loaded button 38a and that there are two, symmetrically arranged, cam engaging surfaces 40, and FIGS. 26 and 27 clearly show that there are, on the opposite side of the main body 80a, two, symmetrically arranged, teeth 74.

FIG. 28 schematically shows the first attachment portion 22 of the handle 16 and the second attachment portion 24 of the workpiece 18, in this case the combined axe head and saw blade workpiece, in separate positions where they are about to be brought together to form a tool, in this case the axe 12.

FIGS. 28 to 30 are sectioned to show the operation of the cam clamping lever 28. The cam engaging surface 40a of the second attachment portion 24 is a concavely shaped surface which is eccentrically contoured to match the contour of the eccentric cam surface 36 of the cam clamping lever 28. On the opposite side of the second attachment portion 24 to that of the cam engaging surface 40a is a tooth 74a. In a corresponding position in the sleeve 26 of the first attachment portion 22 is a depression 76. As shown in FIGS. 29 and 30, the tooth 74a is caught and held tightly in the depression 76 when the eccentric cam surface 36 of the cam clamping lever 28 is pressed tightly against the cam engaging surface 40a after the first and second attachment portions 22, 24 have been slidably engaged and clamped together. This results in an extremely strong connection or lock which will prevent the workpiece 18 dislodging and sliding out from the handle 16 during rough or prolonged use.

Figure 33:
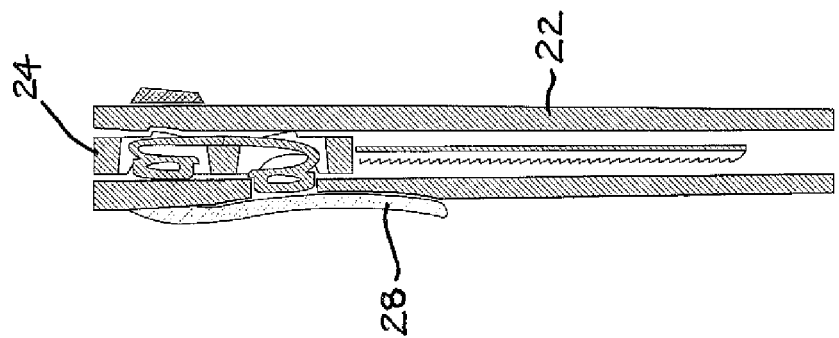
FIG. 33 is a view similar to that of FIG. 32 but showing the first attachment portion of the handle and the second attachment portion of the combined workpiece after being finally engaged together in a second step to form an axe of the present invention.
Figure 32:
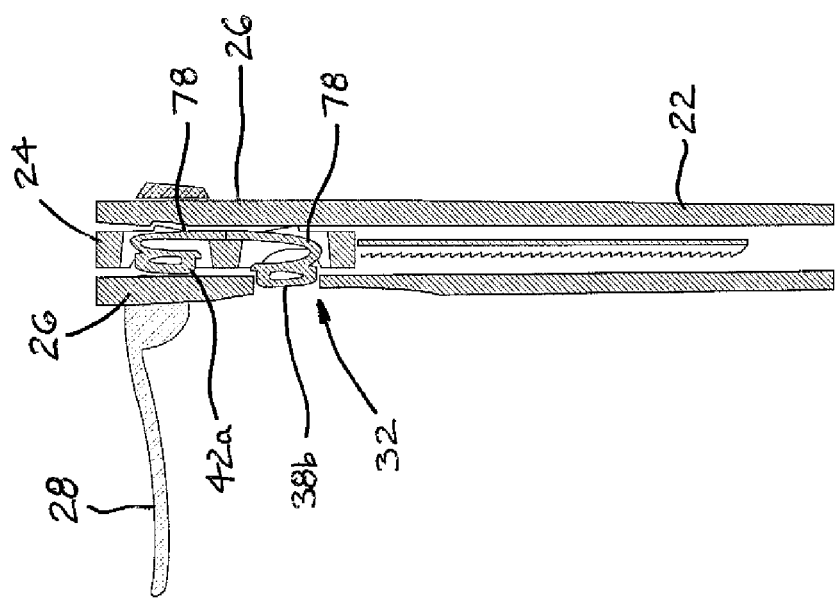
FIG. 32 is a view similar to that of FIG. 31 but showing the first attachment portion of the handle and the second attachment portion of the combined workpiece after being initially engaged together in a first step for forming an axe of the present invention.
Figure 31:
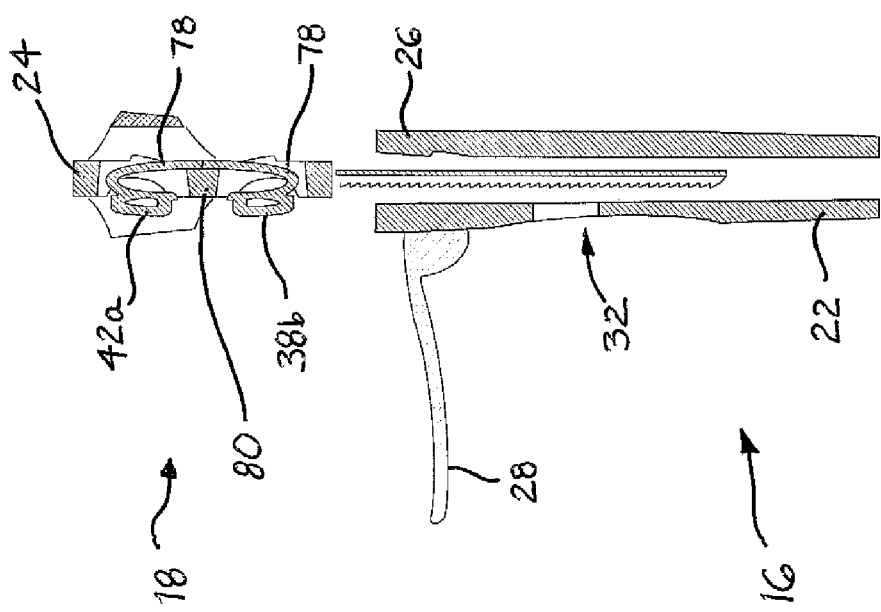
FIG. 31 is a schematic sectional side view of a first attachment portion of a handle and a second attachment portion of a combined axe head and saw blade workpiece of the present invention which are arranged for forming an axe, the first and second attachment portions being shown before they are engaged together for the purpose of showing the operation of the spring loaded button.

FIGS. 31 to 33 are similar to FIGS. 28 to 30 except that they have been sectioned differently to show the operation of the spring loaded buttons 38b, 42a. The buttons 38b, 42a are each spring biased by a curved and flexible connecting member 78 which is connected, at its other end, to a main body 80 of the second attachment portion 24. Under this spring bias, the button 38b can move into the clip-lock aperture 32 and remain in that engaged position (as shown in FIGS. 20 and 21) until there is a requirement to disconnect the workpiece 18 from the handle 16. When there is such a requirement, a user operates the cam clamping lever 28 (by lifting it) to move the eccentric cam surface 36 out from the cam-lock aperture 34 of the sleeve 26 so that the handle 16 and the workpiece 18 no longer assume a locked configuration, and the user then presses on the button 38b to enable the workpiece 18 to be slid out from the handle 16. During the time that the button 38b is in its engaged position in the clip-lock aperture 32 and subsequently when the workpiece 18 is being slid out from the handle 16, the other button 42a remains depressed against its spring bias by an internal surface of the sleeve 26.

Figure 34:
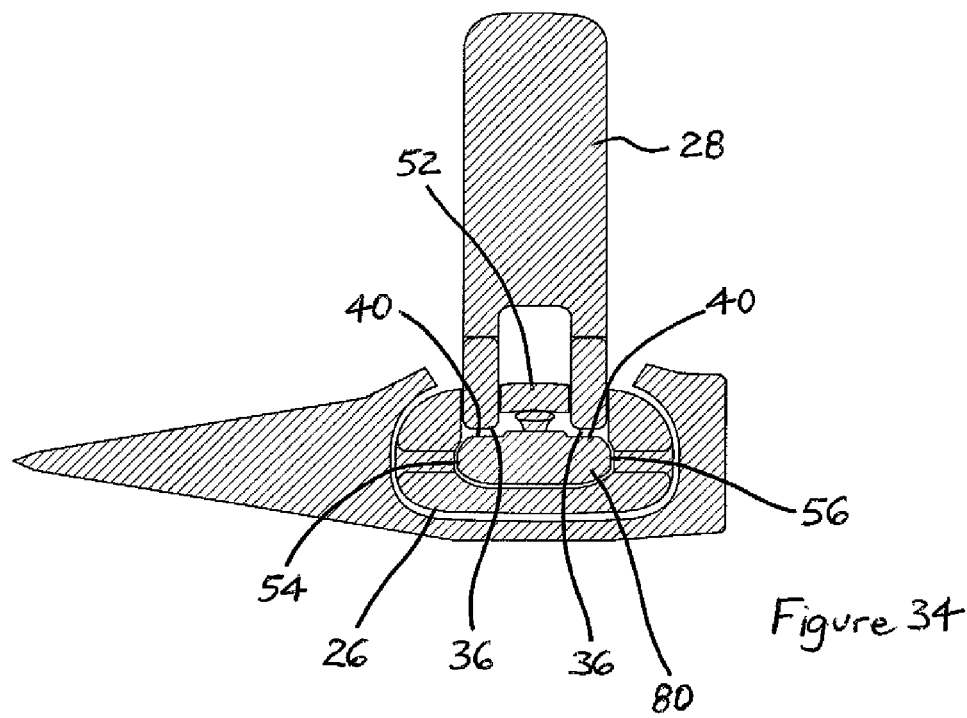
FIGS. 34 to 36 are schematic sectional top views of three consecutive stages of the second step of finally attaching together the combined workpiece and the handle shown in FIGS. 6 to 9 to form the axe shown in FIG. 10, and of finally attaching together the combined workpiece and the handle shown in FIGS. 11 to 14 to form the saw shown in FIG. 15.
Figure 35:
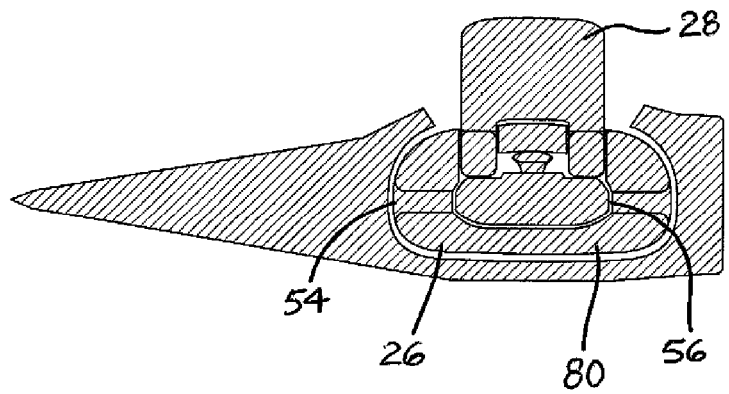
Figure 36:
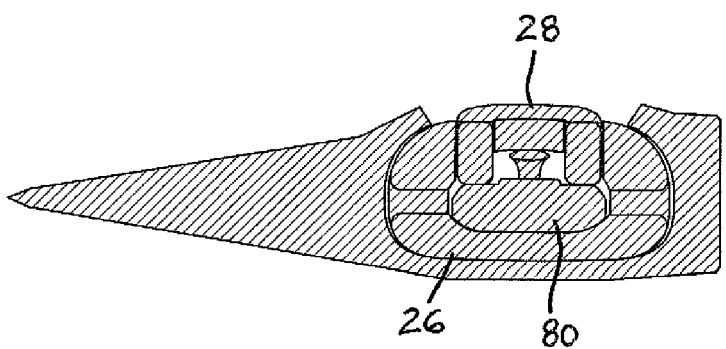

FIGS. 34 to 36 schematically and sectionally show three consecutive stages of the second step of finally attaching together the combined axe head and saw blade workpiece 18 and the handle 16 to form the axe 12. The same operation as shown in FIGS. 34 to 36 can be carried out to finally attach together the combined axe head and saw blade workpiece 18 and the handle 16 to form the saw 14.

As the cam clamping lever 28 is lowered (as shown from FIG. 34 to FIG. 36) from its raised position to its lowered position, its eccentric cam surface 36 progressively applies firmer pressure on the cam engaging surface 40, and the main body 80 is pushed and deformed laterally (in opposite outward directions aligned with the pivot axis of the lever pivot pin) such that the side edges 54, 56 of the main body 80 urge forcefully or bulge against the adjacent edges of the sleeve 26 of the handle 16.

This creates tension between the outside of the main body 80 and the inside of the sleeve 26. This bulging effect and the resulting increased tension provides an even firmer locking of the combined workpiece 18 to the handle 16.

FIG. 37 schematically shows the first attachment portion 22 of the handle 16 and the second attachment portion 24 of the workpiece 18, in this case the combined axe head and saw blade workpiece, in separate positions where the combined workpiece is being released from the handle and, instead of being used as an axe, the tool will be used as a saw 14.

FIGS. 37 to 39 are sectioned to show the operation of the cam clamping lever 28. The cam engaging surface 40b of the second attachment portion 24 is a concavely shaped surface which is eccentrically contoured to match the contour of the eccentric cam surface 36 of the cam clamping lever 28. On the opposite side of the second attachment portion 24 to that of the cam engaging surface 40b is a tooth 74b. In a corresponding position in the sleeve 26 of the first attachment portion 22 is a depression 76. As shown in FIGS. 29 and 30, the tooth 74b is caught and held tightly in the depression 76 when the eccentric cam surface 36 of the cam clamping lever 28 is pressed tightly against the cam engaging surface 40b after the first and second attachment portions 22, 24 have been slidably engaged and clamped together. This results in an extremely strong connection or lock which will prevent the workpiece 18 dislodging and sliding out from the handle 16 during rough or prolonged use.

Figure 42:
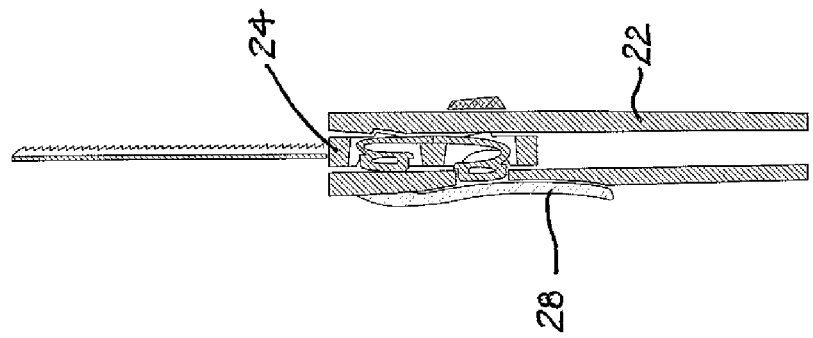
FIG. 42 is a view similar to that of FIG. 41 but showing the first attachment portion of the handle and the second attachment portion of the combined workpiece after being finally engaged together in a second step to form a saw of the present invention.
Figure 41:
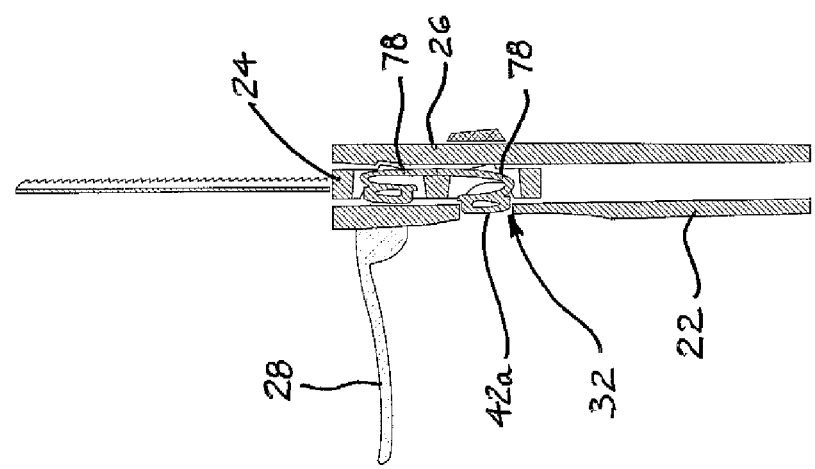
FIG. 41 is a view similar to that of FIG. 40 but showing the first attachment portion of the handle and the second attachment portion of the combined workpiece after being initially engaged together in a first step for forming a saw of the present invention.
Figure 40:
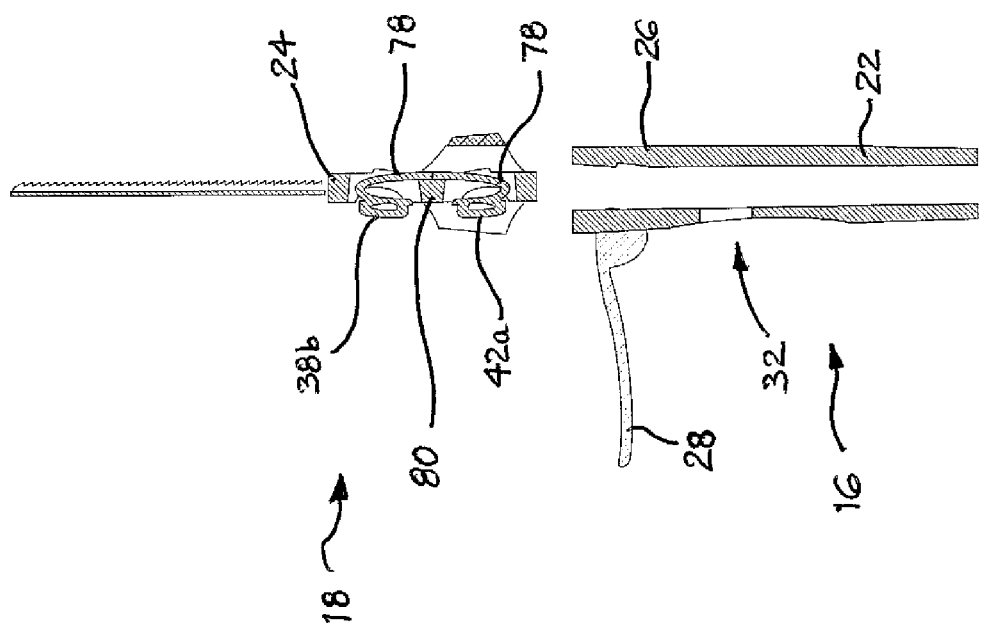
FIG. 40 is a schematic sectional side view of a first attachment portion of a handle and a second attachment portion of a combined axe head and saw blade workpiece of the present invention which are arranged for forming a saw, the first and second attachment portions being shown before they are engaged together for the purpose of showing the operation of the spring loaded button.

FIGS. 40 to 42 are similar to FIGS. 37 to 39 except that they have been sectioned differently to show the operation of the spring loaded buttons 38b, 42a. The buttons 38b, 42a are each spring biased by a curved and flexible connecting member 78 which is connected, at its other end, to a main body 80 of the second attachment portion 24. Under this spring bias, the button 42a can move into the clip-lock aperture 32 and remain in that engaged position (as shown in FIGS. 41 and 42) until there is a requirement to disconnect the workpiece 18 from the handle 16. When there is such a requirement, a user operates the cam clamping lever 28 (by lifting it) to move the eccentric cam surface 36 out from the cam-lock aperture 34 of the sleeve 26 so that the handle 16 and the workpiece 18 no longer assume a locked configuration, and the user then presses on the button 42a to enable the workpiece 18 to be slid out from the handle 16. During the time that the button 42a is in its engaged position in the clip-lock aperture 32 and subsequently when the workpiece 18 is being slid out from the handle 16, the other button 38b remains depressed against its spring bias by an internal surface of the sleeve 26.

Figure 43:
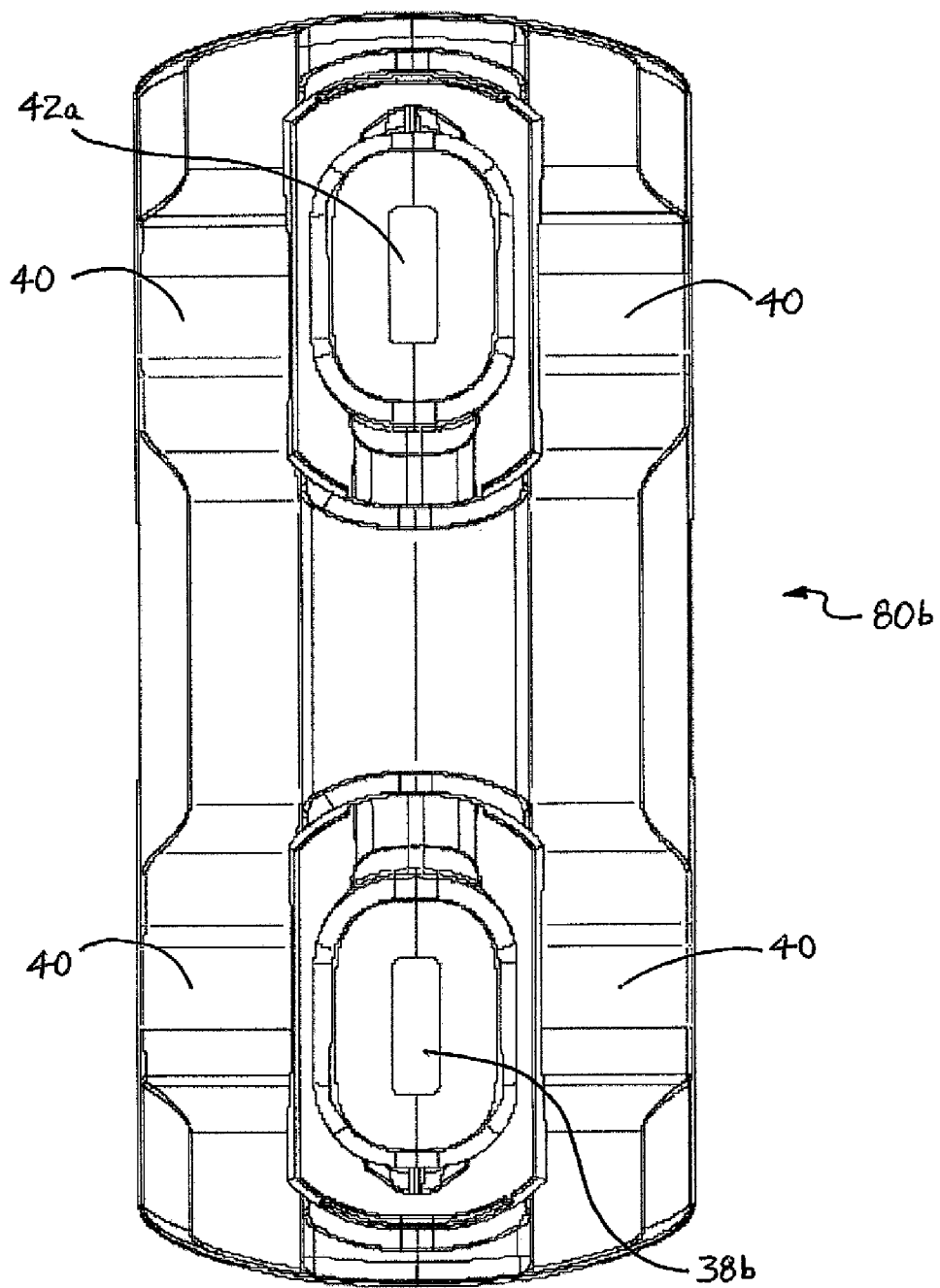
FIG. 43 is a front elevation view of a main body of the second attachment portion of the combined axe head and saw blade workpiece of the present invention, the main body being used for forming both an axe and a saw.
Figure 44:
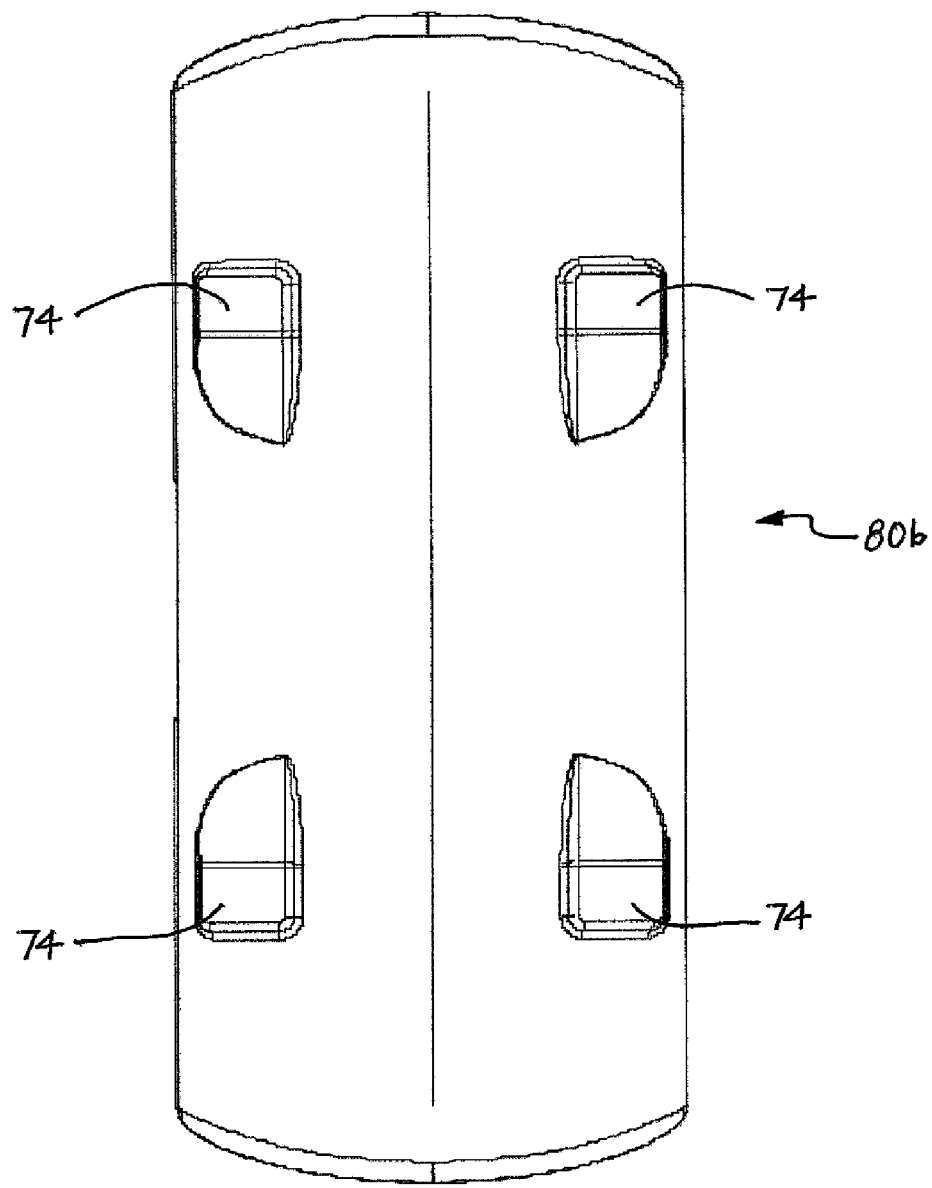
FIG. 44 is a rear elevation view of the main body shown in FIG. 43.
Figure 45:
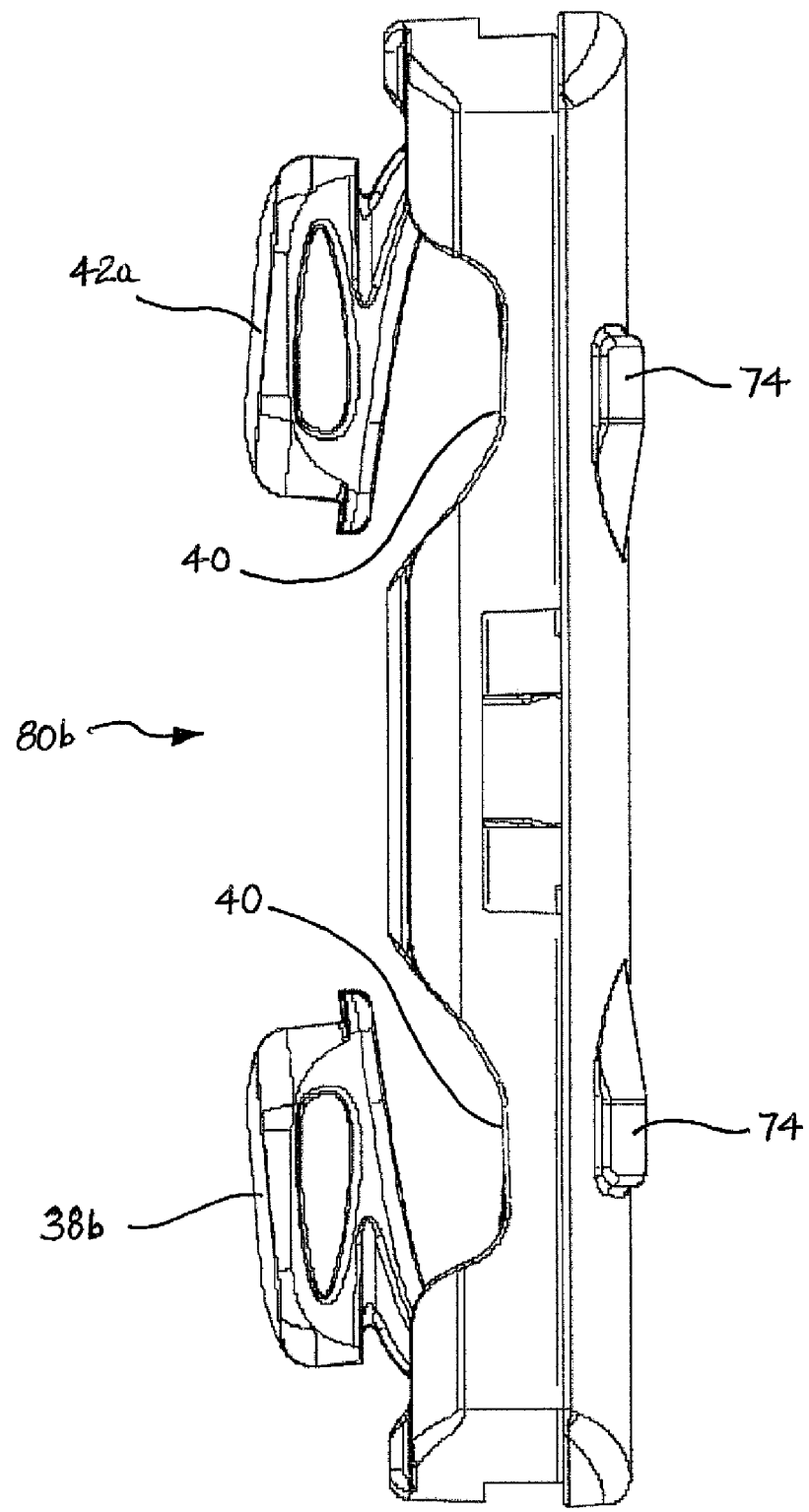
FIG. 45 is a right side elevation view of the main body shown in FIG. 43.

FIGS. 43 to 45 show the main body 80b of the second attachment portion 24 of the combined axe head and saw blade workpiece 18 in isolated front, rear, and right side views, respectively. FIG. 43 clearly shows that there are two spring loaded buttons 38b, 42a and that there are four, symmetrically arranged, cam engaging surfaces 40, and FIGS. 44 and 45 clearly show that there are, on the opposite side of the main body 80b, four, symmetrically arranged, teeth 74.

It will also be readily apparent to persons skilled in the art that various modifications may be made in details of the design and construction of the above embodiments of the multipurpose handle and workpiece attachment tool without departing from the scope or ambit of the present invention.

The reference in this specification to any prior publication (or information derived from it), or to any matter which is known, is not, and should not be taken as an acknowledgement or admission or any form of suggestion that that prior publication (or information derived from it) or known matter forms part of the common general knowledge in the field of endeavour to which this specification relates before the filing date of this patent application.

The invention claimed is:

1. A multipurpose handle and workpiece attachment tool comprising:
   (a) a handle having a grip portion at a first end and a first attachment portion at a second end,
   (b) a workpiece having a second attachment portion adapted to engage the first attachment portion of the handle, wherein
   (c) the first attachment portion of the handle comprises a sleeve having an opening through which the second attachment portion is received, a clip-lock aperture in the sleeve, and a cam clamping lever having an eccentric cam surface which is adapted to be moved into and out of a cam-lock aperture in the sleeve by operation of the cam clamping lever, and
   (d) the second attachment portion of the workpiece comprises a first spring loaded button which is spring biased to move into the clip-lock aperture when the first and second attachment portions are engaged, and a cam engaging surface against which the eccentric cam surface is pressed when the cam clamping lever is operated to move the eccentric cam surface into the cam-lock aperture of the sleeve,
   whereby the handle and the workpiece assume a locked configuration.

2. The tool of claim 1, wherein the workpiece is a shovel blade, and the first and second attachment portions are engaged so that the shovel blade extends linearly from the handle for use of the tool as a shovel.

3. The tool of claim 1, wherein the workpiece is a combined axe head and saw blade in which the axe head extends perpendicularly from the saw blade, and the second attachment portion further comprises a second spring loaded button.

4. The tool of claim 3, wherein the first and second attachment portions are engaged so that the axe head extends perpendicularly from the handle for use of the tool as an axe, and the eccentric cam surface is pressed against the cam engaging surface which is on opposite sides of the second spring loaded button.

5. The tool of claim 4, wherein the saw blade is located in an internal cavity of the handle, which includes the sleeve.

6. The tool of claim 3, wherein the first and second attachment portions are engaged so that the saw blade extends linearly from the handle for use of the tool as a saw, and the eccentric cam surface is pressed against the cam engaging surface which is on opposite sides of the second spring loaded button.

7. The tool of claim 6, wherein the axe head extends perpendicularly from the handle.

8. The tool of claim 3, wherein the sleeve has an internal surface against which the second spring loaded button is depressed when the first spring loaded button is in an engaged position in the clip-lock aperture and subsequently when the workpiece is being slid out from the handle.

9. The tool of claim 3, wherein the first and second spring loaded buttons are spring biased by respective curved and flexible connecting members which are connected, at their other end, to a main body of the second attachment portion.

10. The tool of claim 9, wherein the main body of the second attachment portion of a combined axe head and saw blade workpiece has, on its front side, two spring loaded buttons and four, symmetrically arranged, cam engaging surfaces and also has, on its rear side, four, symmetrically arranged, teeth.

11. The tool of claim 3, wherein the cam clamping lever is pivotally connected to the sleeve so that, upon a user lifting the lever, the eccentric cam surface is moved out from the cam-lock aperture so that the handle and the workpiece no longer assume a locked configuration and then, upon the user pressing on the first spring loaded button, the workpiece is able to be slid out from the handle.

12. The tool of claim 9, wherein the main body has side edges which are urged forcefully against adjacent edges of the sleeve when the cam clamping lever is lowered from a raised position to a lowered position, during which the eccentric cam surface progressively applies firmer pressure on the cam engaging surface so that the main body is pushed and deformed laterally.

13. The tool of claim 1, wherein the first attachment portion has alignment slots formed along the sleeve and the second attachment portion has alignment projections which slidably engage the alignment slots for aligning of the first and second attachment portions when they are engaged.

14. The tool of claim 1, wherein the cam-lock aperture is located nearer to the opening of the sleeve than is the clip-lock aperture.

15. The tool of claim 1, wherein the cam engaging surface is a concavely shaped surface which is eccentrically contoured to match the contour of the eccentric cam surface of the cam clamping lever.

16. The tool of claim 1, wherein there is a tooth on an opposite side of the second attachment portion to that of the cam engaging surface, and there is a depression in a corresponding position in the sleeve of the first attachment portion, such that the tooth is caught and held tightly in the depression when the eccentric cam surface of the cam clamping lever is pressed tightly against the cam engaging surface after the first and second attachment portions have been slidably engaged and clamped together.

17. The tool of claim 1, wherein the first spring loaded button is spring biased by a curved and flexible connecting member which is connected, at its other end, to a main body of the second attachment portion.

18. The tool of claim 17, wherein the main body of the second attachment portion of a shovel blade workpiece has, on its front side, a single spring loaded button and two, symmetrically arranged, cam engaging surfaces and also has, on its rear side, two, symmetrically arranged, teeth.

19. The tool of claim 17, wherein the main body has side edges which are urged forcefully against adjacent edges of the sleeve when the cam clamping lever is lowered from a raised position to a lowered position, during which the eccentric cam surface progressively applies firmer pressure on the cam engaging surface so that the main body is pushed and deformed laterally.

20. The tool of claim 1, wherein the cam clamping lever is pivotally connected to the sleeve so that, upon a user lifting the lever, the eccentric cam surface is moved out from the cam-lock aperture so that the handle and the workpiece no longer assume a locked configuration and then, upon the user pressing on the first spring loaded button, the workpiece is able to be slid out from the handle.

* * * * *